United States Patent
Vallespi-Gonzalez et al.

(10) Patent No.: US 11,885,910 B2
(45) Date of Patent: *Jan. 30, 2024

(54) HYBRID-VIEW LIDAR-BASED OBJECT DETECTION

(71) Applicant: UATC, LLC, Pittsburgh, PA (US)

(72) Inventors: Carlos Vallespi-Gonzalez, Pittsburgh, PA (US); Ankit Laddha, Pittsburgh, PA (US); Gregory P. Meyer, Pittsburgh, PA (US); Eric Randall Kee, Pittsburgh, PA (US)

(73) Assignee: UATC, LLC, Pittsburgh, PA (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/067,135

(22) Filed: Oct. 9, 2020

(65) Prior Publication Data

US 2021/0025989 A1 Jan. 28, 2021

Related U.S. Application Data

(63) Continuation of application No. 15/907,966, filed on Feb. 28, 2018, now Pat. No. 10,809,361, which is a
(Continued)

(51) Int. Cl.
*G01S 7/41* (2006.01)
*G01S 7/4861* (2020.01)
(Continued)

(52) U.S. Cl.
CPC ............ *G01S 7/417* (2013.01); *G01S 7/4802* (2013.01); *G01S 7/4861* (2013.01);
(Continued)

(58) Field of Classification Search
CPC ..... G06K 9/6271; G01S 17/931; G01S 7/417; G01S 7/4802; G01S 7/4861;
(Continued)

(56) References Cited

U.S. PATENT DOCUMENTS 8,825,260 B1 9/2014 Silver
9,234,618 B1 1/2016 Zhu et al.
(Continued)

OTHER PUBLICATIONS

Chen et al., "Multi-View 3D Object Detection Network for Autonomous Driving", arXiv:1611.07759v2, Apr. 11, 2017, 9 pages.
(Continued)

*Primary Examiner* — Mahmoud S Ismail
(74) *Attorney, Agent, or Firm* — Dority & Manning, P.A.

(57) ABSTRACT

Systems and methods for detecting and classifying objects proximate to an autonomous vehicle can include a sensor system and a vehicle computing system. The sensor system includes at least one LIDAR system configured to transmit ranging signals relative to the autonomous vehicle and to generate LIDAR data. The vehicle computing system receives the LIDAR data from the sensor system. The vehicle computing system also determines at least a range-view representation of the LIDAR data and a top-view representation of the LIDAR data, wherein the range-view representation contains a fewer number of total data points than the top-view representation. The vehicle computing system further detects objects of interest in the range-view representation of the LIDAR data and generates a bounding shape for each of the detected objects of interest in the top-view representation of the LIDAR data.

20 Claims, 13 Drawing Sheets

Related U.S. Application Data continuation-in-part of application No. 15/609,256, filed on May 31, 2017, now Pat. No. 10,310,087, and a continuation-in-part of application No. 15/609,141, filed on May 31, 2017, now abandoned.

(60) Provisional application No. 62/579,528, filed on Oct. 31, 2017.

(51) Int. Cl.

| | | |
|---|---|---|
| *G01S 13/931* | (2020.01) | |
| *G01S 7/48* | (2006.01) | |
| *G01S 13/89* | (2006.01) | |
| *G01S 13/86* | (2006.01) | |
| *G01S 17/931* | (2020.01) | |
| *G06F 18/2413* | (2023.01) | |
| *G06V 10/764* | (2022.01) | |
| *G06V 10/82* | (2022.01) | |

(52) U.S. Cl.
CPC .......... *G01S 13/865* (2013.01); *G01S 13/867* (2013.01); *G01S 13/89* (2013.01); *G01S 13/931* (2013.01); *G01S 17/931* (2020.01); *G06F 18/24133* (2023.01); *G06V 10/764* (2022.01); *G06V 10/82* (2022.01); *G01S 2013/932* (2020.01); *G01S 2013/9318* (2020.01); *G01S 2013/9319* (2020.01); *G01S 2013/9322* (2020.01); *G01S 2013/9324* (2020.01); *G01S 2013/93185* (2020.01)

(58) Field of Classification Search
CPC ...... G01S 13/865; G01S 13/867; G01S 13/89; G01S 13/931; G01S 2013/932; G01S 2013/9322; G01S 2013/93185; G01S 2013/9318; G01S 2013/9324; G01S 2013/9319

USPC .......................................................... 701/23
See application file for complete search history.

(56) References Cited

U.S. PATENT DOCUMENTS

| | | | |
|---|---|---|---|
| 9,710,925 | B2 | 7/2017 | Held et al. |
| 2009/0310822 | A1 | 12/2009 | Chang et al. |
| 2015/0192668 | A1* | 7/2015 | Mckitterick .......... G01S 17/933 |
| | | | 702/159 |
| 2015/0363940 | A1* | 12/2015 | Held ...................... G06T 7/207 |
| | | | 382/107 |
| 2016/0171316 | A1* | 6/2016 | Fritsch .................. G06V 10/40 |
| | | | 382/104 |
| 2017/0344838 | A1 | 11/2017 | Zhou et al. |
| 2017/0371329 | A1 | 12/2017 | Giering et al. |
| 2018/0239357 | A1 | 2/2018 | Kim et al. |
| 2018/0121763 | A1* | 5/2018 | Surnilla ................. G08G 1/167 |
| 2018/0136332 | A1 | 5/2018 | Barfield, Jr. et al. |
| 2018/0189578 | A1 | 7/2018 | Yang et al. |
| 2018/0284770 | A1* | 10/2018 | VandenBerg, III .. G08G 1/0133 |

OTHER PUBLICATIONS

Li et al., Vehicle Detection from 3D Lidar Using Fully Convolutional Network, 5 pages.

Petrovskaya et al., Model Based Vehicle Tracking for Autonomous Driving in Urban Environments, Proceedings of robotics: Science and systems IV, Zurich, Switzerland, 2008, 8 pages.

Zelener, Survey of Object Classification in 3D Range Scans, Technical Report, 2015, 32 pages.

\* cited by examiner

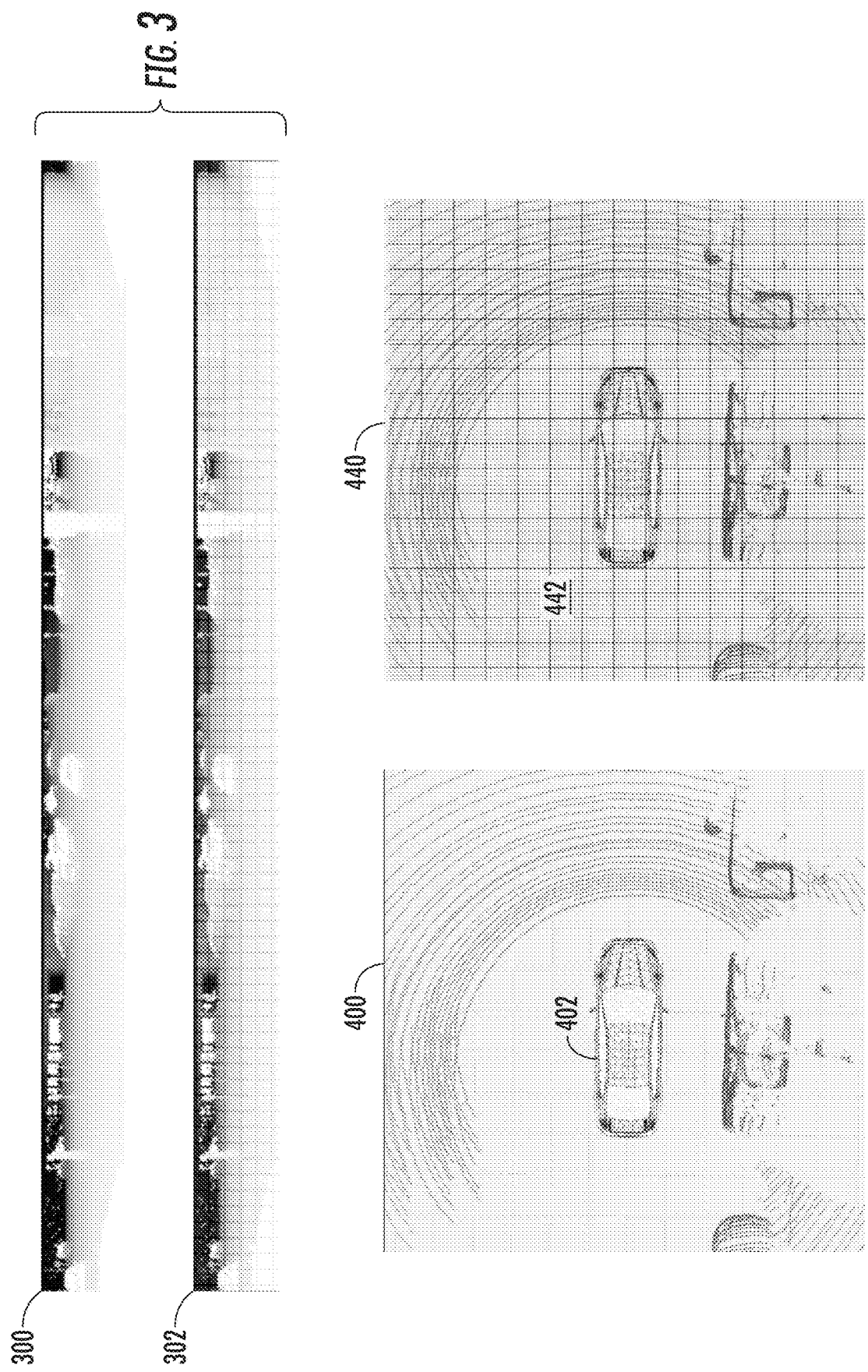

HYBRID-VIEW LIDAR-BASED OBJECT DETECTION

PRIORITY CLAIM

The present application is based on and claims priority to U.S. Provisional Application 62/579,528 having a filing date of Oct. 31, 2017, which is incorporated by reference herein. The present application also claims priority to as a Continuation of U.S. application Ser. No. 15/907,966 having a filing date of Feb. 28, 2018 and claims priority to as a Continuation-In-Part of U.S. application Ser. No. 15/609,141 having a filing date of May 31, 2017 and U.S. application Ser. No. 15/609,256 having a filing date of May 31, 2017, which are both incorporated by reference herein.

FIELD

The present disclosure relates generally to detecting objects of interest. More particularly, the present disclosure relates to detecting and classifying objects that are proximate to an autonomous vehicle using hybrid-view LIDAR-based object detection.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

Thus, a key objective associated with an autonomous vehicle is the ability to perceive objects (e.g., vehicles, pedestrians, cyclists) that are proximate to the autonomous vehicle and, further, to determine classifications of such objects as well as their locations. The ability to accurately and precisely detect and characterize objects of interest is fundamental to enabling the autonomous vehicle to generate an appropriate motion plan through its surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for detecting objects of interest. The method includes receiving, by a computing system that comprises one or more computing devices, LIDAR data from one or more LIDAR systems configured to transmit ranging signals relative to an autonomous vehicle. The method also includes detecting, by the computing system, objects of interest in a first representation of the LIDAR data, wherein each object of interest is detected in a portion of the first representation of the LIDAR data. The method also includes correlating, by the computing system, at least a portion of a second representation of the LIDAR data to the portion of the first representation of LIDAR data to generate, for each corresponding object of interest detected in the first representation of the LIDAR data, a bounding shape in the second representation of the LIDAR data.

Another example aspect of the present disclosure is directed to an object detection system. The object detection system includes a sensor system, one or more processors, a machine-learned detector model, and at least one tangible, non-transitory computer readable medium that stores instructions that, when executed by the one or more processors, cause the one or more processors to perform operations. The sensor system is configured to transmit ranging signals relative to an autonomous vehicle and to generate sensor data. The sensor data is capable of being provided in multiple different representations including at least a first representation of the sensor data and a second representation of the sensor data. The first representation of the sensor data contains a fewer number of total data points than the second representation of the sensor data. The machine-learned detector model has been trained to analyze first and second representations of sensor data to detect objects of interest and to generate bounding shapes for each detected object of interest. The operations include providing at least the first representation of the sensor data to the machine-learned detector model. The operations further include receiving as an output of the machine-learned detector model, at least a bounding shape corresponding to one or more detected objects of interest, wherein each bounding shape is generated relative to the second representation of the sensor data.

Another example aspect of the present disclosure is directed to an autonomous vehicle. The autonomous vehicle includes a sensor system and a vehicle computing system. The sensor system includes at least one LIDAR system configured to transmit ranging signals relative to the autonomous vehicle and to generate LIDAR data. The vehicle computing system includes one or more processors and at least one tangible, non-transitory computer readable medium that stores instructions that, when executed by the one or more processors, cause the one or more processors to perform operations. The operations include receiving the LIDAR data from the sensor system. The operations also include determining at least a range-view representation of the LIDAR data and a top-view representation of the LIDAR data, wherein the range-view representation contains a fewer number of total data points than the top-view representation. The operations also include detecting objects of interest in the range-view representation of the LIDAR data. The operations also include generating a bounding shape for each of the detected objects of interest in the top-view representation of the LIDAR data.

Other aspects of the present disclosure are directed to various methods, systems, apparatuses, vehicles, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 3 depicts an example range-view representation of LIDAR data according to example embodiments of the present disclosure;

FIG. 4 depicts an example top-view representation of LIDAR data according to example embodiments of the present disclosure;

FIG. 5 depicts an example top-view representation of LIDAR data discretized into cells according to example embodiments of the present disclosure;

DETAILED DESCRIPTION

Figure 1:
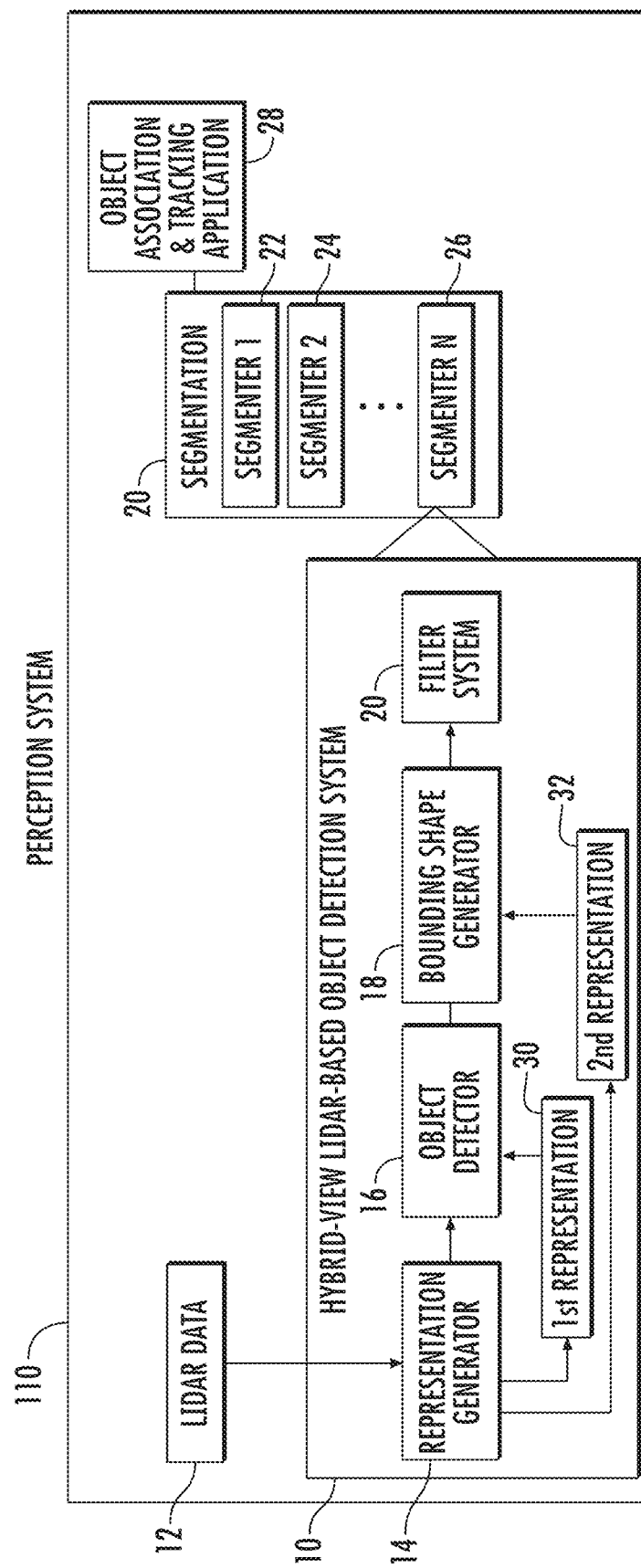
FIG. 1 depicts a block diagram of an example hybrid-view LIDAR-based object detection system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to detecting, classifying, and tracking objects, such as pedestrians, cyclists, other vehicles (whether stationary or moving), and the like, during the operation of an autonomous vehicle. In particular, in some embodiments of the present disclosure, an autonomous vehicle can include a perception system that implements an object detection system to detect potential objects of interest based at least in part on sensor data (e.g., LIDAR data) provided from one or more sensor systems (e.g., LIDAR systems) included in the autonomous vehicle. The perception system can receive and/or determine multiple representations of sensor data (e.g., a first representation and a second representation). The perception system can then detect objects of interest in least one representation of the sensor data, and fit bounding shapes associated with the detected objects using at least one different representation of the sensor data. For example, objects can be detected in a first representation of LIDAR data (e.g., a range-view representation) and then bounding shapes can be fitted in a second representation of the same LIDAR data (e.g., a top-view representation). In some implementations, object detection and bounding shape generation can be implemented by a machine-learned detector model that is trained to receive the multiple representations of sensor data and, in response, infer a detected object and associated bounding shape as an output of the detector model. A hybrid-view approach of analyzing sensor data can simultaneously improve processing speed for object detection by detecting objects in a denser range-view representation of sensor data (e.g., a representation having a fewer number of total data points (e.g., cells) to process), while also improving the accuracy of generated bounding shapes for distinct objects by analyzing the top-view representation of sensor data. As a result of such improved object detection, classification, and tracking, further analysis in autonomous vehicle applications is enhanced, such as those involving prediction, motion planning, and vehicle control, leading to improved passenger safety and vehicle efficiency.

More particularly, in some embodiments of the present disclosure, an autonomous vehicle can include one or more sensor systems. Sensor systems can include one or more cameras and/or one or more ranging systems including, for example, one or more Light Detection and Ranging (LIDAR) systems, and/or one or more Range Detection and Ranging (RADAR) systems. The sensor system can capture a variety of sensor data (e.g., image data, ranging data (e.g., LIDAR data, RADAR data, etc.). In some implementations, the sensor system including the LIDAR system is mounted on the autonomous vehicle, such as, for example, on the roof of the autonomous vehicle. For LIDAR-based object detection, for example, an object detection system can receive LIDAR data from one or more LIDAR systems configured to transmit ranging signals relative to an autonomous vehicle. In some embodiments, LIDAR data includes a three-dimensional point cloud of LIDAR data points received from around the periphery of an autonomous vehicle. Such sensor data (e.g., LIDAR data) can then be provided to a vehicle computing system, for example, for the detection, classification, and tracking of objects of interest during the operation of the autonomous vehicle.

More particularly, in some implementations, a vehicle computing system can include an object detection system. The object detection system can implement hybrid-based object detection by analyzing a hybrid combination of different representations of sensor data (e.g., LIDAR data). More particularly, different representations of LIDAR data can be different from a dimensional perspective or represented by different vantage points. As such, according to a further aspect of the present disclosure, one or more computing devices associated with an autonomous vehicle can generate multiple representations (e.g., at least a first representation and a second representation) of the LIDAR data obtained from a LIDAR system.

For example, a first representation can correspond to a range-view representation of LIDAR data, which can include an approximately 360 degree side view of the LIDAR data (e.g., including LIDAR data points received from an approximately 360 degree horizontal periphery around the autonomous vehicle). Such a range-view representation can be characterized by a first dimension (e.g., height) corresponding to a number of channels (e.g., 32 channels, 64 channels) associated with the LIDAR system, and a second dimension corresponding to the angular range of the sensor (e.g., 360 degrees). Each LIDAR system channel can correspond, for example, to a unique light source (e.g., laser) from which a short light pulse (e.g., laser pulse) is emitted and a corresponding Time of Flight (TOF) distance measurement is received corresponding to the time it takes the pulse to travel from the sensor to an object and back.

Additionally, a second representation of sensor data can correspond to a different representation of the same sensor data. Such second representation can either be obtained directly from the sensor (e.g., the LIDAR system) or determined from the first representation of the sensor data obtained from the sensor (e.g., the LIDAR system). For example, a second representation of LIDAR data can correspond to a top-view representation. In contrast to the range-view representation of LIDAR data described above, a top-view representation can correspond to a representation of LIDAR data as viewed from a bird's eye or plan view relative to an autonomous vehicle and/or ground surface. A top-view representation of LIDAR data is generally from a vantage point that is substantially perpendicular to the vantage point of a range-view representation of the same data.

In some implementations, each representation of sensor data can be discretized into a grid of multiple cells, each cell within the grid corresponding to a segment in three-dimensional space. A range-view representation can correspond, for example, to a grid of multiple cells, wherein each cell within the grid can correspond to a horizontal segment (e.g., ray) in three-dimensional space. A top-view representation can correspond, for example, to a grid of multiple cells, wherein each cell within the grid can correspond to a vertical segment (e.g., column) in three-dimensional space. The LIDAR data can include a plurality of LIDAR data points that are projected onto respective cells within the grid of multiple cells associated with each respective representation of the LIDAR data.

More particularly, in some implementations, the first representation of LIDAR data (e.g., a range-view representation) can be characterized by a first number of cells that is substantially less than a second number of cells characterizing the second representation of LIDAR data (e.g., a top-view representation). For example, in some implementations, the first number of cells can substantially correspond to the first dimension times the second dimension. For instance, a range-view representation of LIDAR data obtained from a 64-channel LIDAR system configured to obtain 10 samples per degree over a 360-degree field of view can include (64*360*10)=230,400 cells. In some implementations, the second number of cells can correspond to a substantially circular area defined by a radial dimension. For instance, a top-view representation of LIDAR data corresponding to a substantially circular area having a radial dimension of 100 meters and a resolution of one cell per 10 cm can include $\pi*(1,000)^2$=3,141,592 cells.

In some implementations, an object detection system can be configured to detect objects of interest within the representation of sensor data (e.g., LIDAR data) having a fewer number of total data points (e.g., cells). By processing a denser representation of sensor data, the processing speed for object detection can be increased (e.g., latency is decreased). Continuing with the example from above, detecting objects within the first number of cells of range-view LIDAR data (e.g., 230,400 cells) can be at least an order of magnitude faster than detecting objects within the second number of cells of top-view LIDAR data (e.g., 3,141,592 cells).

More particularly, in some implementations, detecting objects of interest within a representation of LIDAR data can include determining one or more cell statistics characterizing the LIDAR data corresponding to each cell. In some examples, the one or more cell statistics can include, for example, one or more parameters associated with a distribution of LIDAR data points projected onto each cell. For instance, such parameters can include the number of LIDAR data points projected onto each cell, the average, variance, range, minimum and/or maximum value of a parameter for each LIDAR data point. In some examples, the one or more cell statistics can include, for example, one or more parameters associated with a power or intensity of LIDAR data points projected onto each cell.

In some implementations, detecting objects within a representation of LIDAR data can include determining a feature extraction vector for each cell based at least in part on the one or more cell statistics for that cell. Additionally or alternatively, a feature extraction vector for each cell can be based at least in part on the one or more cell statistics for surrounding cells. More particularly, in some examples, a feature extraction vector aggregates one or more cell statistics of surrounding cells at one or more different scales. For example, a first scale can correspond to a first group of cells that includes only a given cell. Cell statistics for the first group of cells (e.g., the given cell) can be calculated, a function can be determined based on those cell statistics, and the determined function can be included in a feature extraction vector. A second scale can correspond to a second group of cells that includes the given cell as well as a subset of cells surrounding the given cell. Cell statistics for the second group of cells can be calculated, a function can be determined based on those cell statistics, and the determined function can be appended to the feature extraction vector. A third scale can correspond to a third group of cells that includes the given cell as well as a subset of cells surrounding the given cell, wherein the third group of cells is larger than the second group of cells. Cell statistics for the third group of cells can be calculated, a function can be determined based on those cell statistics, and the determined function can be appended to the feature extraction vector.

This process can be continued for a predetermined number of scales until the predetermined number has been reached. Such a multi-scale technique for extracting features can be advantageous in detecting objects of interest having different sizes (e.g., vehicles versus pedestrians).

In some implementations, detecting objects of interest within a representation of LIDAR data can include determining a classification for each cell based at least in part on the one or more cell statistics. In some implementations, a classification for each cell can be determined based at least in part on the feature extraction vector determined for each cell. In some implementations, the classification for each cell can include an indication of whether that cell includes (or does not include) a detected object of interest. In some examples, the classification for each cell can include an indication of whether that cell includes a detected object of interest from a predetermined set of objects of interest (e.g., a vehicle, a bicycle, a pedestrian, etc.). In some examples, the classification for each cell can include a probability score associated with each classification indicating the likelihood that such cell includes one or more particular classes of objects of interest.

According to another aspect of the present disclosure, in some implementations, an object detection system can be configured to fit bounding shapes (e.g., two-dimensional or three-dimensional bounding boxes and/or bounding polygons) to detected objects of interest. In some implementations, the bounding shapes can be generated within the representation of sensor data (e.g., LIDAR data) having a greater number of total data points (e.g., cells). By processing a more comprehensive representation of sensor data from a top-view representation for the determination of bounding shapes, distinct bounding shapes can be more accurately fitted for unique objects. This is especially true for situations when unique objects of interest are detected in close proximity to other objects, such as when a pedestrian is standing beside a vehicle.

More particularly, in some implementations, generating bounding shapes within a different representation of LIDAR data (e.g., a second representation of LIDAR data) than the representation in which objects of interest are detected (e.g., a first representation of LIDAR data) can include correlating at least a portion of the second representation of LIDAR data to the portion of the first representation of LIDAR data that corresponds to each of the detected objects of interest. By correlating at least a portion of the second representation of LIDAR data to the portion of the first representation of LIDAR data that corresponds to each detected object, bounding shapes can be fitted within a second representation of LIDAR data without having to process the entire second representation for either object detection of bounding shape generation.

More particularly, in some implementations, generating bounding shapes within a second representation of LIDAR data can include generating a plurality of proposed bounding shapes positioned relative to each detected object of interest (e.g., cluster of cells having a similar classification). A score for each proposed bounding shape can be determined. In some examples, each score can be based at least in part on a number of cells having one or more predetermined classifications within each proposed bounding shape. The bounding shape ultimately determined for each corresponding cluster of cells (e.g., object instance) can be determined at least in part on the scores for each proposed bounding shape. In some examples, the ultimate bounding shape determination from the plurality of proposed bounding shapes can be additionally or alternatively based on a filtering technique (e.g., non-maximum suppression (NMS) analysis) of the proposed bounding shapes to remove and/or reduce any overlapping bounding boxes.

In some embodiments, the object detection system can include or otherwise access a machine-learned detector model to facilitate both the detection of potential objects of interest and generation of bounding shapes for such detected objects. In some embodiments, the machine-learned detector model can include various models, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

According to some embodiments of the present disclosure, the data input into the machine-learned detector model can include at least the first representation of sensor data. In some embodiments, the data input into the machine-learned detector model can include the first representation of sensor data and the second representation of sensor data. In embodiments when the data input into the machine-learned detector model includes only the first representation of sensor data, the model can be trained in part to determine the second representation of sensor data from the first representation of sensor data. In some embodiments, the one or more representations of sensor data provided as input to the machine-learned detector model can be pre-processed to include determined characteristics for cells within the one or more representations. In response to receipt of the one or more representations of sensor data, an indication of whether each cell includes a detected object of interest can be received as an output of the machine-learned detector model. In addition, a bounding shape for detected objects of interest can be simultaneously received as an output of the machine-learned detector model. By using multiple representations of sensor data with a machine-learned model, an object detection system according to embodiments of the present disclosure can more accurately detect objects of interest and generate bounding shapes, thereby improving the classification and tracking of such objects of interest in a perception system of an autonomous vehicle.

In some implementations, when training the machine-learned detector model to detect objects of interest and generate bounding shapes for detected objects, a detector training dataset can include a large number of previously obtained representations of sensor data and corresponding labels that describe corresponding objects detected within such sensor data representations including bounding shapes for such detected objects.

In one implementation, the detector training dataset can include a first portion of data corresponding to one or more representations of sensor data (e.g., LIDAR data) originating from a LIDAR system associated with an autonomous vehicle. The sensor data (e.g., LIDAR data) can, for example, be recorded while an autonomous vehicle is in navigational operation. The detector training dataset can further include a second portion of data corresponding to labels identifying corresponding objects detected within each portion of input sensor data. In some implementations, the labels can include at least a bounding shape corresponding to each detected object of interest. In some implementations, the labels can additionally include a classification for each object of interest from a predetermined set of objects including one or more of a pedestrian, a vehicle, or a bicycle. The labels included within the second portion of data within the detector training dataset can be manually annotated, automatically annotated, or annotated using a combination of automatic labeling and manual labeling.

In some implementations, to train the detector model, a training computing system can input a first portion of a set of ground-truth data (e.g., the first portion of the detector training dataset corresponding to the one or more representations of sensor data) into the machine-learned detector model to be trained. In response to receipt of such first portion, the machine-learned detector model outputs bounding shapes and/or classifications for objects of interest detected within the sensor data representations. This output of the machine-learned detector model predicts the remainder of the set of ground-truth data (e.g., the second portion of the detector training dataset). After such prediction, the training computing system can apply or otherwise determine a loss function that compares the bounding shapes and/or object classifications output by the machine-learned detector model to the remainder of the ground-truth data which the detector model attempted to predict. The training computing system then can backpropagate the loss function through the detector model to train the detector model (e.g., by modifying one or more weights associated with the detector model). This process of inputting ground-truth data, determining a loss function, and backpropagating the loss function through the detector model can be repeated numerous times as part of training the detector model. For example, the process can be repeated for each of numerous sets of ground-truth data provided within the detector training dataset.

An autonomous vehicle can include a sensor system as described above as well as a vehicle computing system. The vehicle computing system can include one or more computing devices and one or more vehicle controls. The one or more computing devices can include a perception system, a prediction system, and a motion planning system that cooperate to perceive the surrounding environment of the autonomous vehicle and determine a motion plan for controlling the motion of the autonomous vehicle accordingly. The vehicle computing system can receive sensor data from the sensor system as described above and utilize such sensor data in the ultimate motion planning of the autonomous vehicle.

In particular, in some implementations, the perception system can receive sensor data from one or more sensors (e.g., one or more ranging systems and/or a plurality of cameras) that are coupled to or otherwise included within the sensor system of the autonomous vehicle. The sensor data can include information that describes the location (e.g., in three-dimensional space relative to the autonomous vehicle) of points that correspond to objects within the surrounding environment of the autonomous vehicle (e.g., at one or more times). As one example, for a LIDAR system, the ranging data from the one or more ranging systems can include the location (e.g., in three-dimensional space relative to the LIDAR system) of a number of points (e.g., LIDAR points) that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

The perception system can identify one or more objects that are proximate to the autonomous vehicle based on sensor data received from the one or more sensor systems. In particular, in some implementations, the perception system can determine, for each object, state data that describes a current state of such object. As examples, the state data for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle versus pedestrian versus bicycle versus other); yaw rate; and/or other state information. In some implementations, the perception system can determine state data for each object over a number of iterations. In particular, the perception system can update the state data for each object at each iteration. Thus, the perception system can detect and track objects (e.g., vehicles, bicycles, pedestrians, etc.) that are proximate to the autonomous vehicle over time, and thereby produce a presentation of the world around an autonomous vehicle along with its state (e.g., a presentation of the objects of interest within a scene at the current time along with the states of the objects).

The prediction system can receive the state data from the perception system and predict one or more future locations and/or moving paths for each object based on such state data. For example, the prediction system can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system can determine a motion plan for the autonomous vehicle based at least in part on one or more predicted future locations and/or moving paths for the object and/or the state data for the object provided by the perception system. Stated differently, given information about the current locations of objects and/or predicted future locations and/or moving paths of proximate objects, the motion planning system can determine a motion plan for the autonomous vehicle that best navigates the autonomous vehicle along the determined travel route relative to the objects at such locations.

As one example, in some implementations, the motion planning system can determine a cost function for each of one or more candidate motion plans for the autonomous vehicle based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

Thus, given information about the current locations and/or predicted future locations and/or moving paths of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle controller that controls one or more vehicle controls (e.g., actuators or other devices that control gas flow, steering, braking, etc.) to execute the selected motion plan.

The systems and methods described herein may provide a number of technical effects and benefits. By using a hybrid-view representation and analysis of LIDAR data as described herein, an object detection system according to embodiments of the present disclosure can provide a technical effect and benefit of more accurately detecting objects of interest and thereby improving the classification and tracking of such objects of interest in a perception system of an autonomous vehicle. For example, performing more accurate segmentation provides for improved tracking by having cleaner segmented objects and provides for improved classification once objects are properly segmented. Such improved object detection accuracy can be particularly advantageous for use in conjunction with vehicle computing systems for autonomous vehicles. Because vehicle computing systems for autonomous vehicles are tasked with repeatedly detecting and analyzing objects in sensor data for tracking and classification of objects of interest (including other vehicles, cyclists, pedestrians, traffic control devices, and the like) and then determining necessary responses to such objects of interest, improved object detection accuracy allows for faster and more accurate object tracking and classification. Improved object tracking and classification can have a direct effect on the provision of safer and smoother automated control of vehicle systems and improved overall performance of autonomous vehicles.

The systems and methods described herein may also provide a technical effect and benefit of improving processing speed and reducing latency for object detection by detecting objects within a denser range-view representation of sensor data (e.g., a representation having a fewer number of total data points (e.g., cells) to process). Compared to implementing object detection within an entirety of a top-view representation of the same sensor data, such processing speeds can often be improved by at least an order of magnitude. Faster object detection can also reduce latency in related autonomy applications including classification, association, tracking, prediction, motion planning, and vehicle control, leading to improved vehicle response time, improved passenger safety and vehicle efficiency.

The systems and methods described herein may also provide a technical effect and benefit of improving object segmentation in cases where smaller objects are close to larger objects. Prior segmentation approaches often have difficulty distinguishing smaller instances from larger instances when the instances are close to each other, for example, resulting in a segmentation error where the smaller instance is segmented in as part of the larger instance. In one example, a segmentation error may result in merging a pedestrian into a vehicle that is close by the pedestrian. In such a situation, autonomous vehicle motion planning may determine a vehicle trajectory that does not include as wide a berth as generally preferred when passing a pedestrian. A smaller marginal passing distance may be acceptable when navigating an autonomous vehicle past another vehicle, but a larger marginal passing distance may be preferred when navigating the autonomous vehicle past a pedestrian. The improved object detection systems and methods as described herein provide for improved segmentation whereby smaller instances (e.g., objects such as pedestrians) are not merged with larger instances (e.g., objects such as vehicles) that are nearby.

The systems and methods described herein may also provide resulting improvements to computing technology tasked with object detection, tracking, and classification. The systems and methods described herein may provide improvements in the speed and accuracy of object detection and classification, resulting in improved operational speed and reduced processing requirements for vehicle computing systems, and ultimately more efficient vehicle control.

With reference to the figures, example embodiments of the present disclosure will be discussed in further detail.

FIG. 1 depicts a block diagram of an example object detection system within a perception system of an autonomous vehicle according to example embodiments of the present disclosure. In particular, FIG. 1 illustrates an example embodiment of a hybrid-view LIDAR-based object detection system 10 which provides object detection in a segmentation system 20 of a perception system 110. The perception system 110 can also include an object association and tracking application 28 and other optional systems configured to collectively contribute to detecting, classifying, associating and/or tracking one or more objects. In some implementations, the segmentation system 20 can include one or more different segmenters (e.g., Segmenter 1 22, Segmenter 2 24, . . . , Segmenter N 26) including hybrid-view LIDAR-based object detection system 10. The segmentation system 20 can generate one or more object segments corresponding to instances of detected objects and provide the object segments to an associated system (e.g., an object classification and tracking application 28) or other portions of perception system 110. Additional exemplary details of perception system 110 are described in further detail in FIGS. 2A and 2B.

Referring still to FIG. 1, hybrid-view LIDAR-based object detection system 10 can be configured to receive or otherwise obtain LIDAR data 12. In some implementations, LIDAR data 108 can be obtained from one or more LIDAR systems configured to transmit ranging signals relative to an autonomous vehicle and generate LIDAR data 12 based on the ranging signals received back at the LIDAR system(s) after transmission and reflection off objects in the surrounding environment. In some embodiments, LIDAR data 12 can include a three-dimensional point cloud of LIDAR data points received from around the periphery of an autonomous vehicle. For example, LIDAR data 12 can be obtained in response to a LIDAR sweep within an approximately 360 degree field of view around an autonomous vehicle.

In some implementations, hybrid-view LIDAR-based object detection system 10 can more particularly be configured to include one or more systems, including, for example, a representation generator 14, an object detector 16, a bounding shape generator 18, and a filter system 20. Each of the representation generator 14, object detector 16, bounding shape generator 18, and filter system 20 can include computer logic utilized to provide desired functionality. In some implementations, each of the representation generator 14, object detector 16, bounding shape generator 18, and filter system 20 can be implemented in hardware, firmware, and/or software controlling a general purpose processor. For example, in some implementations, each of the representation generator 14, object detector 16, bounding shape generator 18, and filter system 20 includes program files stored on a storage device, loaded into a memory, and executed by one or more processors. In other implementations, each of the representation generator 14, object detector 16, bounding shape generator 18, and filter system 20 includes one or more sets of computer-executable instructions that are stored in a tangible computer-readable storage medium such as RAM hard disk or optical or magnetic media.

Referring still to FIG. 1, one or more computing devices associated with hybrid-view LIDAR-based object detection system 10 can generate multiple representations (e.g., at least a first representation and a second representation) of the LIDAR data 10 obtained from a LIDAR system. More particularly, representation generator 14 can be configured to generate a first representation 30 and a second representation 32 of LIDAR data. For example, a first representation 30 can correspond to a range-view representation of LIDAR data, which can include an approximately 360 degree side view of the LIDAR data (e.g., including LIDAR data points received from an approximately 360 degree horizontal periphery around the autonomous vehicle). Such a range-view representation can be characterized by a first dimension (e.g., height) corresponding to a number of channels (e.g., 32 channels, 64 channels) associated with the LIDAR system, and a second dimension corresponding to the angular range of the sensor (e.g., 360 degrees). Each LIDAR system channel can correspond, for example, to a unique light source (e.g., laser) from which a short light pulse (e.g., laser pulse) is emitted and a corresponding Time of Flight (TOF) distance measurement is received corresponding to the time it takes the pulse to travel from the sensor to an object and back. An example range-view representation of LIDAR data generated by representation generator 14 is depicted in FIG. 3.

Additionally, a second representation 32 of LIDAR data can correspond to a different representation of the same sensor data. Such second representation 32 can either be obtained directly from the sensor (e.g., from LIDAR data 12) or determined from the first representation 30 of the LIDAR data obtained from the sensor (e.g., the LIDAR system). For example, a second representation 32 of LIDAR data can correspond to a top-view representation. In contrast to the first representation 30 (e.g., a range-view representation) of LIDAR data described above, a top-view representation can correspond to a representation of LIDAR data as viewed from a bird's eye or plan view relative to an autonomous vehicle and/or ground surface. A top-view representation of LIDAR data is generally from a vantage point that is substantially perpendicular to the vantage point of a range-view representation of the same data. An example top-view representation of LIDAR data generated by representation generator 14 is depicted in FIG. 4.

Figure 6:
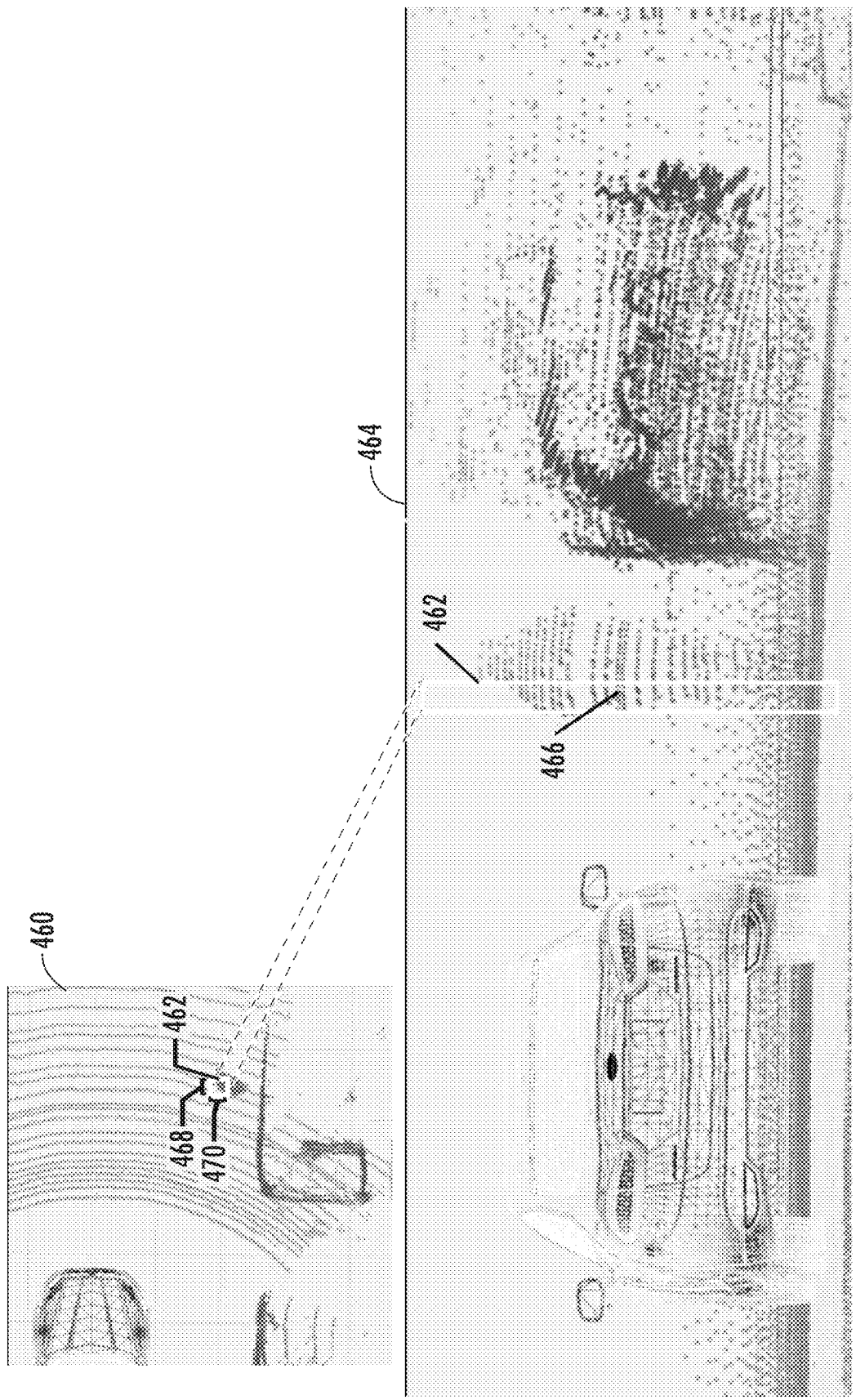
FIG. 6 provides a visual example of how each cell in a top-view representation corresponds to a column in three-dimensional space according to example embodiments of the present disclosure.

In some implementations, each representation of sensor data can be discretized into a grid of multiple cells, each cell within the grid corresponding to a segment in three-dimensional space. When first representation 30 corresponds to a range-view representation, such representation can correspond, for example, to a grid of multiple cells, wherein each cell within the grid can correspond to a horizontal segment (e.g., ray) in three-dimensional space. When second representation 32 corresponds to a top-view representation, such representation can correspond, for example, to a grid of multiple cells, wherein each cell within the grid can correspond to a vertical segment (e.g., column) in three-dimensional space. The LIDAR data 10 can include a plurality of LIDAR data points that are projected onto respective cells within the grid of multiple cells associated with each respective representation 30, 32 of the LIDAR data. For example, FIG. 5 depicts an example of how a top-view representation of LIDAR data such as depicted in FIG. 4 can be discretized into a grid of multiple cells, while a visual example of how each cell in a top-view representation corresponds to a column in three-dimensional space is depicted in FIG. 6.

In some implementations, the first representation 30 of LIDAR data (e.g., a range-view representation) can be characterized by a first number of cells that is substantially less than a second number of cells characterizing the second representation 32 of LIDAR data (e.g., a top-view representation). For example, in some implementations, the first number of cells can substantially correspond to a first dimension times a second dimension. For instance, a range-view representation of LIDAR data obtained from a 64-channel LIDAR system configured to obtain 10 samples per degree over a 360-degree field of view can include (64*360*10)=230,400 cells. In some implementations, the second number of cells can correspond to a substantially circular area defined by a radial dimension. For instance, a top-view representation of LIDAR data corresponding to a substantially circular area having a radial dimension of 100 meters and a resolution of one cell per 10 cm can include $\pi*(1,000)^2=3,141,592$ cells.

Referring still to FIG. 1, one or more computing devices associated with an hybrid-view LIDAR-based object detection system 10 can implement object detector 16 to detect objects of interest within the first representation 30 of sensor data (e.g., LIDAR data) having a fewer number of total data points (e.g., cells). Because first representation 30 is a denser representation of sensor data than second representation 32, the processing speed for object detection can be increased (e.g., latency is decreased). Continuing with the example from above, detecting objects within the first number of cells of range-view LIDAR data (e.g., 230,400 cells) can be at least an order of magnitude faster than detecting objects within the second number of cells of top-view LIDAR data (e.g., 3,141,592 cells).

More particularly, in some implementations, detecting objects of interest within a first representation 30 of LIDAR data via object detector 16 can include determining one or more cell statistics characterizing the LIDAR data corresponding to each cell. In some examples, the one or more cell statistics can include, for example, one or more parameters associated with a distribution of LIDAR data points projected onto each cell. For instance, such parameters can include the number of LIDAR data points projected onto each cell, the average, variance, range, minimum and/or maximum value of a parameter for each LIDAR data point. In some examples, the one or more cell statistics can include, for example, one or more parameters associated with a power or intensity of LIDAR data points projected onto each cell.

In some implementations, detecting objects within a first representation 30 of LIDAR data via object detector 16 can include determining a feature extraction vector for each cell based at least in part on the one or more cell statistics for that cell. Additionally or alternatively, a feature extraction vector for each cell can be based at least in part on the one or more cell statistics for surrounding cells. More particularly, in some examples, a feature extraction vector aggregates one or more cell statistics of surrounding cells at one or more different scales. For example, a first scale can correspond to a first group of cells that includes only a given cell. Cell statistics for the first group of cells (e.g., the given cell) can be calculated, a function can be determined based on those cell statistics, and the determined function can be included in a feature extraction vector. A second scale can correspond to a second group of cells that includes the given cell as well as a subset of cells surrounding the given cell. Cell statistics for the second group of cells can be calculated, a function can be determined based on those cell statistics, and the determined function can be appended to the feature extraction vector. A third scale can correspond to a third group of cells that includes the given cell as well as a subset of cells surrounding the given cell, wherein the third group of cells is larger than the second group of cells. Cell statistics for the third group of cells can be calculated, a function can be determined based on those cell statistics, and the determined function can be appended to the feature extraction vector. This process can be continued for a predetermined number of scales until the predetermined number has been reached.

Such a multi-scale technique for extracting features can be advantageous in detecting objects of interest having different sizes (e.g., vehicles versus pedestrians).

In some implementations, detecting objects of interest within a first representation 30 of LIDAR data via object detector 16 can include determining a classification for each cell based at least in part on the one or more cell statistics. In some implementations, a classification for each cell can be determined based at least in part on the feature extraction vector determined for each cell. In some implementations, the classification for each cell can include an indication of whether that cell includes (or does not include) a detected object of interest. In some examples, the classification for each cell can include an indication of whether that cell includes a detected object of interest from a predetermined set of objects of interest (e.g., a vehicle, a bicycle, a pedestrian, etc.). In some examples, the classification for each cell can include a probability score associated with each classification indicating the likelihood that such cell includes one or more particular classes of objects of interest.

Referring still to FIG. 1, one or more computing devices associated with hybrid-view LIDAR-based object detection system 10 can be configured to fit bounding shapes (e.g., two-dimensional or three-dimensional bounding boxes and/or bounding polygons) to objects of interest detected by object detector 16. In some implementations, bounding shape generator 18 can generate bounding shapes within the second representation 32 of sensor data (e.g., LIDAR data) having a greater number of total data points (e.g., cells). By processing a more comprehensive representation of sensor data from a top-view representation for the determination of bounding shapes, distinct bounding shapes can be more accurately fitted for unique objects. This is especially true for situations when unique objects of interest are detected in close proximity to other objects, such as when a pedestrian is standing beside a vehicle.

More particularly, in some implementations, generating bounding shapes via bounding shape generator 18 within a different representation of LIDAR data (e.g., a second representation 32 of LIDAR data) than the representation in which objects of interest are detected (e.g., a first representation 30 of LIDAR data) can include correlating at least a portion of the second representation 32 of LIDAR data to the portion of the first representation 30 of LIDAR data that corresponds to each of the detected objects of interest. By correlating at least a portion of the second representation 32 of LIDAR data to the portion of the first representation 30 of LIDAR data that corresponds to each detected object, bounding shapes can be fitted within a second representation 32 of LIDAR data without having to process the entire second representation 32 by object detector 16 or bounding shape generator 18.

More particularly, in some implementations, implementing bounding shape generator 18 within a second representation 32 of LIDAR data can include generating a plurality of proposed bounding shapes positioned relative to each detected object of interest (e.g., cluster of cells having a similar classification). A score for each proposed bounding shape can be determined. In some examples, each score can be based at least in part on a number of cells having one or more predetermined classifications within each proposed bounding shape. The bounding shape ultimately determined for each corresponding cluster of cells (e.g., object instance) can be determined at least in part on the scores for each proposed bounding shape. In some examples, the ultimate bounding shape determination from the plurality of proposed bounding shapes can be additionally or alternatively based on a filtering technique (e.g., non-maximum suppression (NMS) analysis) of the proposed bounding shapes to remove and/or reduce any overlapping bounding boxes. In some implementation, the filtering technique can be implemented by a filtering system 20 that implements the NMS analysis or other filtering technique.

Bounding shape generator 18 can generate a plurality of proposed two-dimensional (2D) bounding shapes (e.g., bounding boxes or other polygons) or three-dimensional (3D) bounding shapes (e.g., rectangular prisms or other 3D shapes) within a second representation 32 of sensor data for each clustered group of cells corresponding to an instance of a detected object of interest detected within first representation 30 of sensor data. Each proposed bounding shape within second representation 32 can be positioned relative to a corresponding cluster of cells within first representation 30 having one or more predetermined classifications.

Filtering system 120 can then help to filter the plurality of proposed bounding shapes generated by bounding shape generation system 118. The output of filtering system 120 can correspond, for example, to a bounding shape determined from the plurality of proposed bounding shapes as best corresponding to a particular instance of a detected object. This ultimate bounding shape determination can be referred to as an object segment, which can be provided as an output of top-view LIDAR-based object detection system 100, for example, as an output that is provided to an object classification and tracking application or other application. More particular aspects associated with a bounding shape generation system 118 and filtering system 120 are depicted in and described with reference to FIGS. 9-11.

Figure 2A:
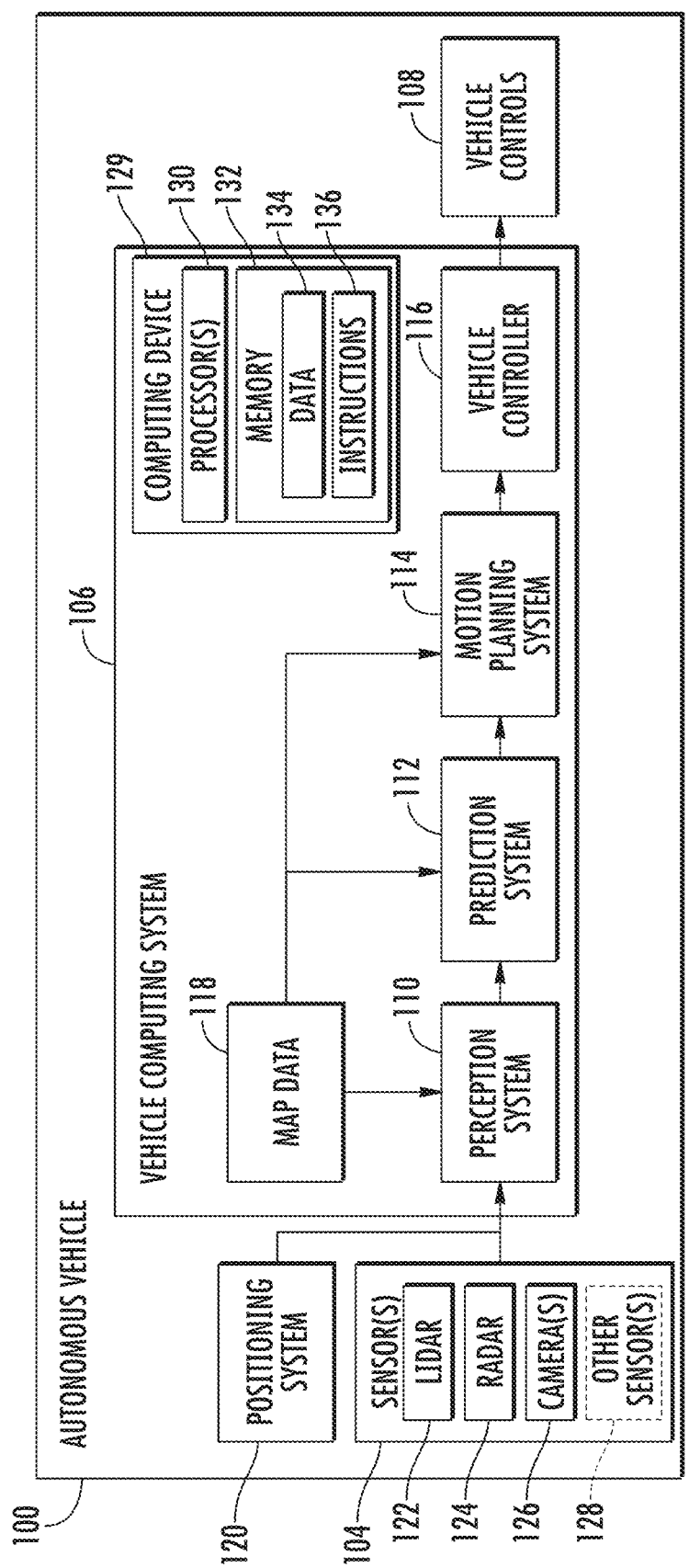
FIG. 2A depicts a block diagram of an example system for controlling the navigation of a vehicle according to example embodiments of the present disclosure.

FIG. 2A depicts a block diagram of an example system for controlling the navigation of an autonomous vehicle 100 according to example embodiments of the present disclosure. The autonomous vehicle 100 is capable of sensing its environment and navigating with little to no human input. The autonomous vehicle 100 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 100 can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 100 can include one or more sensors 104, a vehicle computing system 106, and one or more vehicle controls 108. The vehicle computing system 106 can assist in controlling the autonomous vehicle 100. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 100 according to the motion path.

The vehicle computing system 106 can include one or more computing devices 129 that respectively include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle computing system 106 to perform operations. In some implementations, the one or more processors 130 and at least one memory 132 may be comprised in one or more computing devices, such as computing device(s) 129, within the vehicle computing system 106.

In some implementations, vehicle computing system 106 can further be connected to, or include, a positioning system 120. Positioning system 120 can determine a current geographic location of the autonomous vehicle 100. The positioning system 120 can be any device or circuitry for analyzing the position of the autonomous vehicle 100. For example, the positioning system 120 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position. The position of the autonomous vehicle 100 can be used by various systems of the vehicle computing system 106.

As illustrated in FIG. 2A, in some embodiments, the vehicle computing system 106 can include a perception system 110, a prediction system 112, and a motion planning system 114 that cooperate to perceive the surrounding environment of the autonomous vehicle 100 and determine a motion plan for controlling the motion of the autonomous vehicle 100 accordingly.

In particular, in some implementations, the perception system 110 can receive sensor data from the one or more sensors 104 that are coupled to or otherwise included within the autonomous vehicle 100. As examples, the one or more sensors 104 can include a Light Detection and Ranging (LIDAR) system 122, a Radio Detection and Ranging (RADAR) system 124, one or more cameras 126 (e.g., visible spectrum cameras, infrared cameras, etc.), and/or other sensors 128. The sensor data can include information that describes the location of objects within the surrounding environment of the autonomous vehicle 100.

As one example, for LIDAR system 122, the sensor data can include the location (e.g., in three-dimensional space relative to the LIDAR system 122) of a number of points that correspond to objects that have reflected a ranging laser. For example, LIDAR system 122 can measure distances by measuring the Time of Flight (TOF) that it takes a short laser pulse to travel from the sensor to an object and back, calculating the distance from the known speed of light. In some implementations, LIDAR system 122 of FIG. 2A can be configured to obtain LIDAR data 12 of FIG. 1.

As another example, for RADAR system 124, the sensor data can include the location (e.g., in three-dimensional space relative to RADAR system 124) of a number of points that correspond to objects that have reflected a ranging radio wave. For example, radio waves (pulsed or continuous) transmitted by the RADAR system 124 can reflect off an object and return to a receiver of the RADAR system 124, giving information about the object's location and speed. Thus, RADAR system 124 can provide useful information about the current speed of an object.

As yet another example, for one or more cameras 126, various processing techniques (e.g., range imaging techniques such as, for example, structure from motion, structured light, stereo triangulation, and/or other techniques) can be performed to identify the location (e.g., in three-dimensional space relative to the one or more cameras 126) of a number of points that correspond to objects that are depicted in imagery captured by the one or more cameras 126. Other sensor systems 128 can identify the location of points that correspond to objects as well.

Thus, the one or more sensors 104 can be used to collect sensor data that includes information that describes the location (e.g., in three-dimensional space relative to the autonomous vehicle 100) of points that correspond to objects within the surrounding environment of the autonomous vehicle 100.

In addition to the sensor data, the perception system 110 can retrieve or otherwise obtain map data 118 that provides detailed information about the surrounding environment of the autonomous vehicle 100. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the autonomous vehicle 100 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 100 over time.

The prediction system 112 can receive the state data from the perception system 110 and predict one or more future locations and/or moving paths for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 100 based at least in part on the predicted one or more future locations and/or moving paths for the object provided by the prediction system 112 and/or the state data for the object provided by the perception system 110. Stated differently, given information about the current locations of objects and/or predicted future locations and/or moving paths of proximate objects, the motion planning system 114 can determine a motion plan for the autonomous vehicle 100 that best navigates the autonomous vehicle 100 relative to the objects at such locations.

As one example, in some implementations, the motion planning system 114 can determine a cost function for each of one or more candidate motion plans for the autonomous vehicle 100 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 100 approaches a possible impact with another object and/or deviates from a preferred pathway (e.g., a preapproved pathway).

Thus, given information about the current locations and/or predicted future locations and/or moving paths of objects, the motion planning system 114 can determine a cost of adhering to a particular candidate pathway. The motion planning system 114 can select or determine a motion plan for the autonomous vehicle 100 based at least in part on the cost function(s). For example, the candidate motion plan that minimizes the cost function can be selected or otherwise determined. The motion planning system 114 can provide the selected motion plan to a vehicle controller 116 that controls one or more vehicle controls 108 (e.g., actuators or other devices that control gas flow, acceleration, steering, braking, etc.) to execute the selected motion plan.

Each of the perception system 110, the prediction system 112, the motion planning system 114, and the vehicle controller 116 can include computer logic utilized to provide desired functionality. In some implementations, each of the perception system 110, the prediction system 112, the motion planning system 114, and the vehicle controller 116 can be implemented in hardware, firmware, and/or software controlling a general purpose processor. For example, in some implementations, each of the perception system 110, the prediction system 112, the motion planning system 114, and the vehicle controller 116 includes program files stored on a storage device, loaded into a memory, and executed by one or more processors. In other implementations, each of the perception system 110, the prediction system 112, the motion planning system 114, and the vehicle controller 116 includes one or more sets of computer-executable instructions that are stored in a tangible computer-readable storage medium such as RAM hard disk or optical or magnetic media.

Figure 2B:
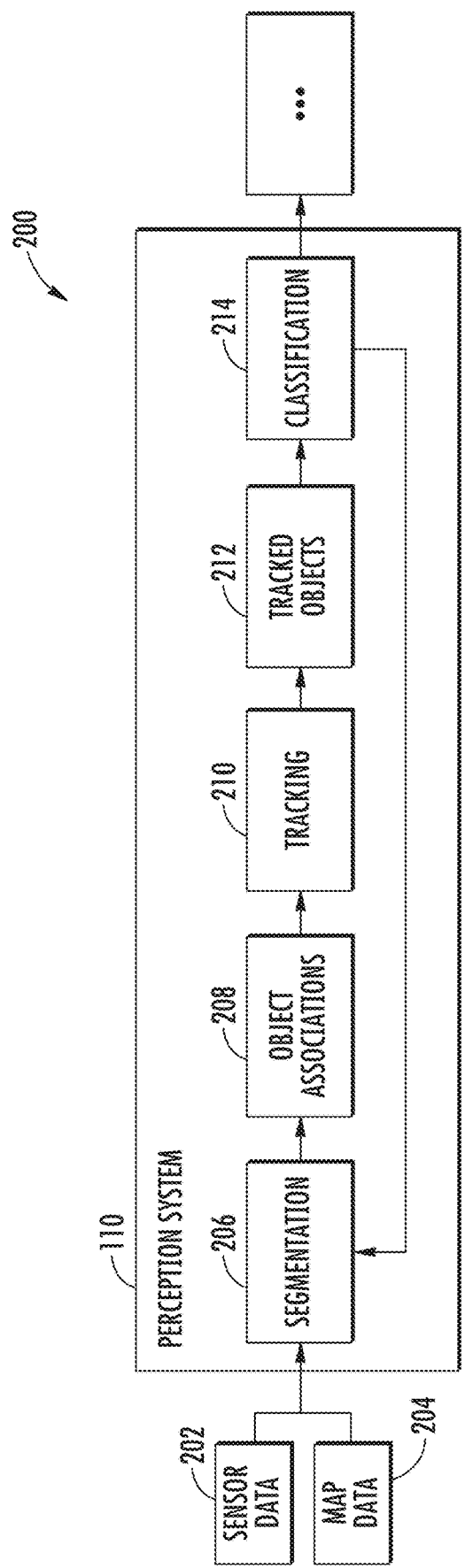
FIG. 2B depicts a block diagram of an example perception system according to example embodiments of the present disclosure.

FIG. 2B depicts a block diagram of an example perception system 110 according to example embodiments of the present disclosure. As discussed in regard to FIG. 2A, a vehicle computing system 106 can include a perception system 110 that can identify one or more objects that are proximate to an autonomous vehicle 100. In some embodiments, the perception system 110 can include segmentation system 206, object associations system 208, tracking system 210, tracked objects system 212, and classification system 214. The perception system 110 can receive sensor data 202 (e.g., from one or more sensors 104 of the autonomous vehicle 100) and optional map data 204 (e.g., corresponding to map data 118 of FIG. 2A) as input. The perception system 110 can use the sensor data 202 and the map data 204 in determining objects within the surrounding environment of the autonomous vehicle 100. In some embodiments, the perception system 110 iteratively processes the sensor data 202 to detect, track, and classify objects identified within the sensor data 202. In some examples, the map data 204 can help localize the sensor data 202 to positional locations within a map or other reference system.

Within the perception system 110, the segmentation system 206 can process the received sensor data 202 and map data 204 to determine potential objects within the surrounding environment, for example using one or more object detection systems including the disclosed hybrid-view LIDAR-based object detection system 100. The object associations system 208 can receive data about the determined objects and analyze prior object instance data to determine a most likely association of each determined object with a prior object instance, or in some cases, determine if the potential object is a new object instance.

The tracking system 210 can determine the current state of each object instance, for example, in terms of its current position, velocity, acceleration, heading, orientation, uncertainties, and/or the like. The tracked objects system 212 can receive data regarding the object instances and their associated state data and determine object instances to be tracked by the perception system 110. The classification system 214 can receive the data from tracked objects system 212 and classify each of the object instances. For example, classification system 214 can classify a tracked object as an object from a predetermined set of objects (e.g., a vehicle, bicycle, pedestrian, etc.). The perception system 110 can provide the object and state data for use by various other systems within the vehicle computing system 106, such as the prediction system 112 of FIG. 2A.

FIG. 3 depicts example aspects of a first representation of LIDAR sensor data according to example embodiments of the present disclosure. In particular, FIG. 3 depicts example aspects of a first representation 30 of LIDAR data generated by representation generator 14 such as described in FIG. 1. FIG. 3 depicts a first range-view representation 300 and a second range-view representation 302. First range-view representation 300 provides a graphical depiction of LIDAR sensor data collected by a LIDAR system (e.g., LIDAR system 122 of autonomous vehicle 100 of FIG. 2). The first range-view representation can be associated with LIDAR data that indicates how far away an object is from the LIDAR system 122 (e.g., the distance to an object struck by a ranging laser beam from the LIDAR system 122). The LIDAR data associated with first range-view representation 300 depicts LIDAR points generated from a plurality of ranging laser beams being reflected from objects, with each row of the LIDAR data depicting points generated by each ranging laser beam. In FIG. 3, the LIDAR points are depicted using a colorized gray level to indicate the range of the LIDAR data points from the LIDAR system 122, with darker points being at a greater distance or range. In other implementations, LIDAR data associated with first range-view representation 300 can additionally or alternatively include LIDAR intensity data which indicates how much energy or power is returned to the LIDAR system 122 by the ranging laser beams being reflected from an object.

Second range-view representation 302 is similar to first range-view representation 300, but is discretized into a grid 304 of multiple cells. Grid 304 can be provided as a framework for characterizing the LIDAR data (e.g., LIDAR data 12 of FIG. 1) such that respective portions of the LIDAR data can be identified as corresponding to discrete cells within the grid 304 of multiple cells. The LIDAR data (e.g., LIDAR data 12 of FIG. 1) can include a plurality of LIDAR data points that are projected onto respective cells within the grid 304 of multiple cells.

Referring now to FIGS. 4-6, various depictions of example top-view representations of LIDAR data are provided. In some implementations, the top-view representations of LIDAR data depicted in FIGS. 4-6 correspond to a second representation 32 generated by representation generator 14 of FIG. 1.

FIG. 4 depicts an example top-view representation 400 of LIDAR data generated by representation generator 14 of FIG. 1. Top-view representation 400 includes a depiction of an autonomous vehicle 402 associated with a LIDAR system. In some implementations, autonomous vehicle 402 can correspond to autonomous vehicle 100 of FIG. 2A, which is associated with LIDAR system 122. LIDAR system 122 can, for example, be mounted to a location on autonomous vehicle 402 and configured to transmit ranging signals relative to the autonomous vehicle 402 and to generate LIDAR data (e.g., LIDAR data 12 of FIG. 1). The LIDAR data depicted in FIG. 4 can indicate how far away an object is from the LIDAR system (e.g., the distance to an object struck by a ranging laser beam from the LIDAR system associated with autonomous vehicle 402). The top-view representation 400 of LIDAR data illustrated in FIG. 4 depicts LIDAR points generated from a plurality of ranging laser beams being reflected from objects that are proximate to autonomous vehicle 402.

FIG. 5 provides an example top-view representation 440 of LIDAR data that is discretized into a grid 442 of multiple cells. Grid 442 can be provided as a framework for characterizing the LIDAR data such that respective portions of the LIDAR data can be identified as corresponding to discrete cells within the grid 442 of multiple cells. The LIDAR data can include a plurality of LIDAR data points that are projected onto respective cells within the grid 442 of multiple cells.

For instance, FIG. 6 visually illustrates how each cell in a top-view representation such as depicted in FIG. 5 can correspond to a column in three-dimensional space and can include zero or more LIDAR data points within each cell. More particularly, FIG. 6 provides a top-view representation 460 that is a magnified view of a portion of the LIDAR data contained within top-view representation 400 of FIG. 4 and top-view representation 440 of FIG. 5. Cell 462 in top-view representation 460 is intended to represent one cell within the grid 442 of multiple cells depicted in FIG. 5. Side-view representation 464 of FIG. 6 shows how the same cell 462 can correspond to a column in three-dimensional space and can include zero or more LIDAR data points 466 within that cell 462.

Referring still to FIGS. 5-6, in some implementations, each cell 462 in the grid 442 of multiple cells can be generally rectangular such that each cell 462 is characterized by a first dimension 468 and a second dimension 470. In some implementations, although not required, the first dimension 468 and second dimension 470 of each cell 462 is substantially equivalent such that grid 442 corresponds to a grid of generally square cells. The first dimension 468 and second dimension 470 can be designed to create a suitable resolution based on the types of objects that are desired for detection. In some examples, each cell 462 can be characterized by first and second dimensions 468/470 on the order of between about 5 and 25 centimeters (cm). In some examples, each cell 462 can be characterized by first and second dimensions 468/470 on the order of about 10 cm.

Figure 7:
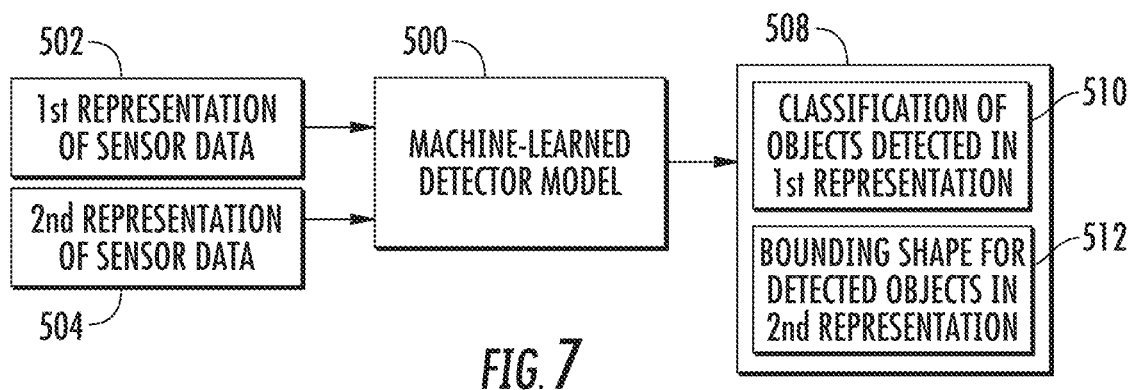
FIG. 7 depicts an example machine-learned detector model according to example embodiments of the present disclosure.

Referring not to FIG. 7, aspects of an example machine-learned detector model 500 according to example embodiments of the present disclosure are presented. In some embodiments, an object detection system (e.g., a hybrid-view LIDAR-based object detection system 10 of FIG. 1) can include or otherwise access a machine-learned detector model 500 to facilitate both the detection of potential objects of interest and generation of bounding shapes for such detected objects. In some embodiments, the machine-learned detector model 500 can include various models, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

According to some embodiments of the present disclosure, the data input into the machine-learned detector model 500 can include at least the first representation of sensor data 502. In some embodiments, the data input into the machine-learned detector model 500 can include the first representation of sensor data 502 and the second representation of sensor data 504. In embodiments when the data input into the machine-learned detector model 500 includes only the first representation of sensor data 502, the machine-learned detector model 500 can be trained in part to determine the second representation of sensor data 504 from the first representation of sensor data 502. In some embodiments, the one or more representations of sensor data provided as input to the machine-learned detector model can be pre-processed to include determined characteristics for cells within the one or more representations.

In response to receipt of the one or more representations of sensor data (e.g., 502 and/or 504), machine-learned detector model 500 can be trained to provide an output 508. In some implementations, a classification 510 for cells within the one or more representations of sensor data can identify detected object(s) of interest as an output 508 of the machine-learned detector model 500. In some examples, classification 510 can include a class prediction for each cell as corresponding to a particular class of object (e.g., a vehicle, a pedestrian, a bicycle, and/or no object). In some examples, classification 510 can additionally include a probability score associated with the class prediction for each cell. Such a probability score can provide a quantifiable value (e.g., a percentage from 0-100 or value from 0.0-1.0) indicating the likelihood that a given cell includes a particular identified classification. For instance, if classification 510 for a given cell predicted that the cell contained a pedestrian, then an associated probability score could indicate that the pedestrian classification is determined to be about 75% accurate.

In some examples, machine-learned detector model 500 can additionally or alternatively be configured and/or trained to generate a bounding shape and/or parameters used to define a bounding shape. In such examples, output 508 of machine-learned detector model 500 can also include bounding shapes and/or related parameters 512 for each cell or for a subset of selected cells. Example bounding shapes 512 can be 2D bounding shapes (e.g., bounding boxes or other polygons) or 3D bounding shapes (e.g., prisms or other shapes). Example parameters associated with bounding shapes 512 can include, for example, center, orientation, width, height, other dimensions, and the like, which can be used to define a bounding shape.

Figure 8:
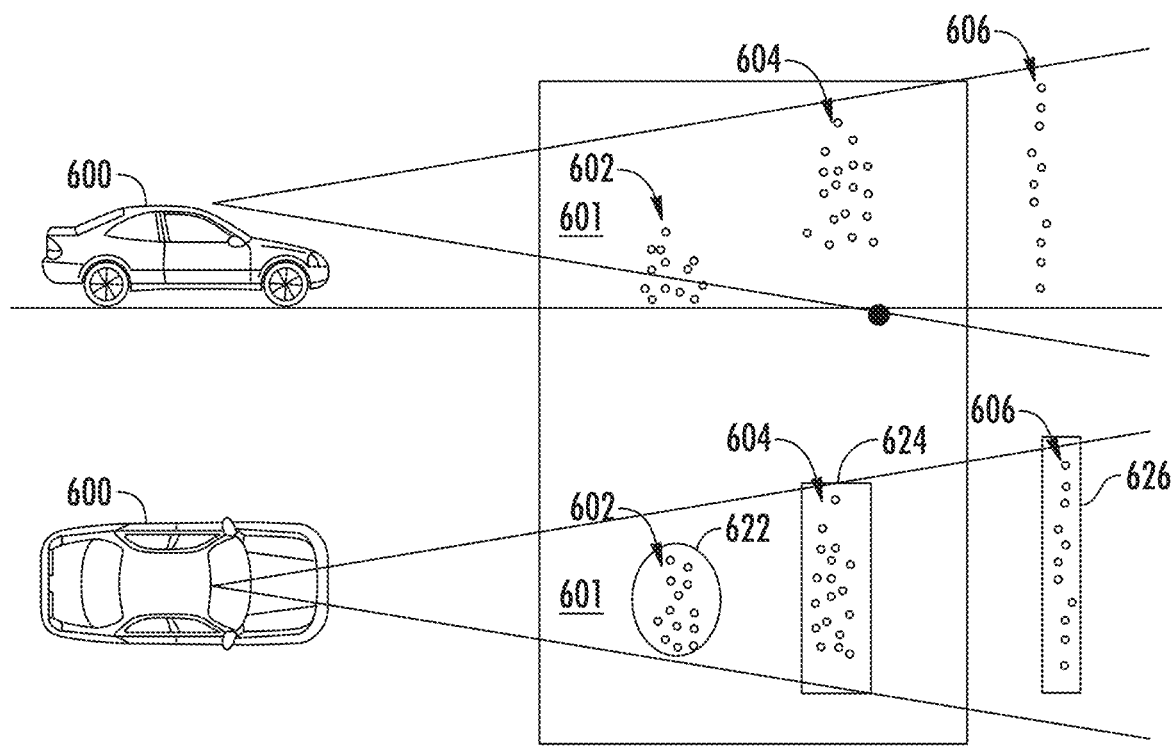
FIG. 8 depicts an example detection of objects of interest in a range-view representation of LIDAR data and generation of bounding shapes in a top-view representation of LIDAR data according to example embodiments of the present disclosure.

Referring now to FIG. 8, example aspects are depicted to describe detection of objects of interest in a range-view representation of LIDAR data and generation of bounding shapes in a top-view representation of LIDAR data according to example embodiments of the present disclosure. More particularly, an example autonomous vehicle 600 is depicted as capturing LIDAR data 601 including a plurality of LIDAR point clusters 602, 604, and 606. The upper portion 610 of FIG. 8 depicts a side-view of LIDAR data 601 relative to an autonomous vehicle 600, while the lower portion 612 of FIG. 8 depicts a top view of the LIDAR data 601 relative to autonomous vehicle 600. Each candidate LIDAR point cluster 602-606 can correspond to one or more distinct objects of interest. An object detector (e.g., object detector 16 of FIG. 1 or machine-learned detector model 500 of FIG. 7) can analyze the range-view representation of LIDAR data 601 to detect first, second and third objects. A first object can correspond, for example, to point cluster 602, which could be classified as a small bush or other piece of foliage. A second object can correspond, for example, to point cluster 604, which could be classified as a pedestrian. A third object can correspond, for example, to point cluster 606, which could be classified as a portion of a building.

A bounding shape generator (e.g., bounding shape generator 18 of FIG. 1 or machine-learned detector model 500 of FIG. 7) can then generate bounding shapes in the lower portion 612 of FIG. 8 after objects are detected in the upper portion 610. For example, a first bounding shape 622 can be generated for the detected first object corresponding to point cluster 602. Second bounding shape 624 can be generated for the detected second object corresponding to point cluster 604, and third bounding shape 626 can be generated for the detected third object corresponding to point cluster 606.

Figure 9:
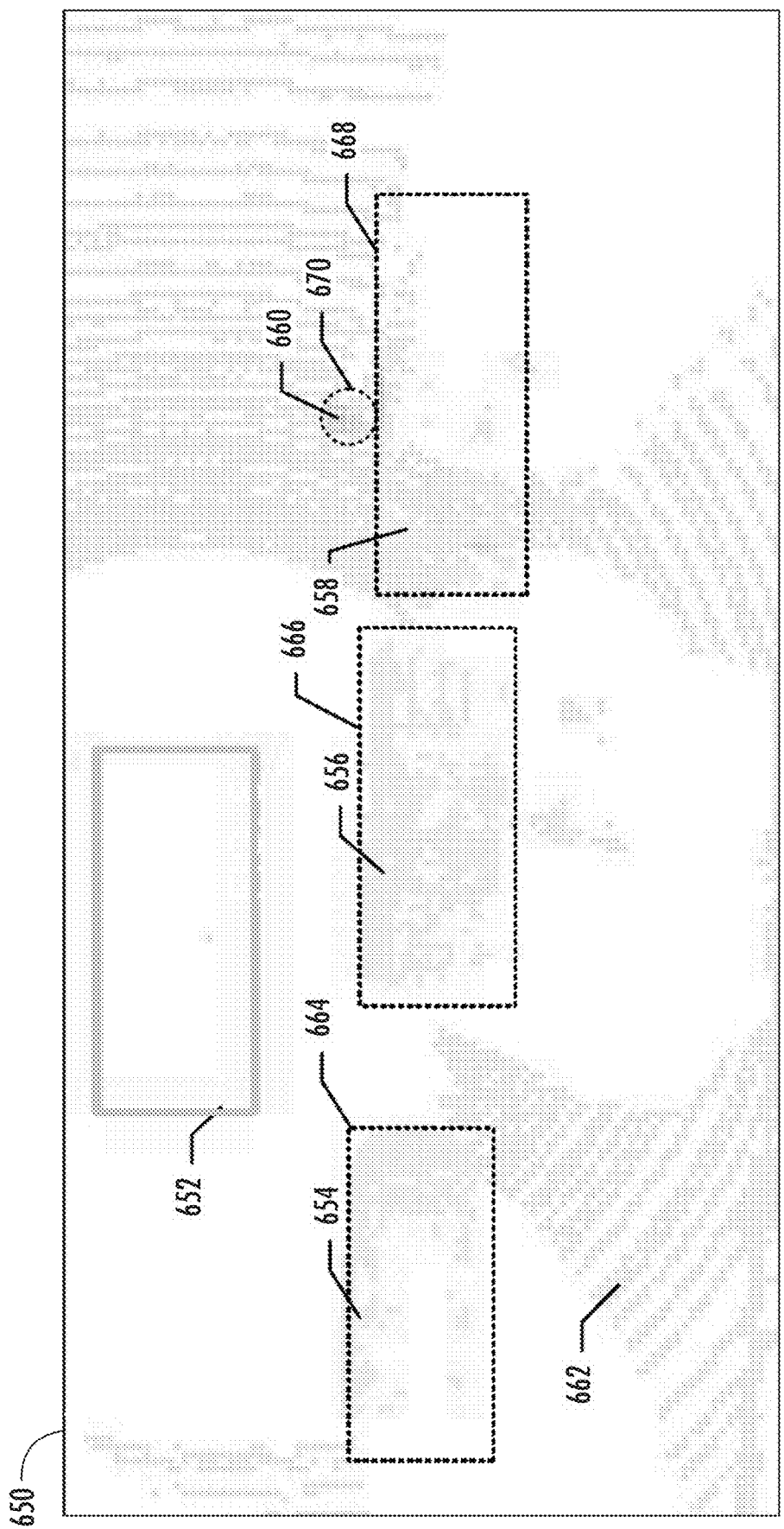
FIG. 9 depicts an example generation of bounding shapes in a top-view representation of LIDAR data based on object classification/detection in a range-view representation of LIDAR data according to example embodiments of the present disclosure.

FIG. 9 depicts an example generation of bounding shapes in a top-view representation of LIDAR data based on object classification/detection in a range-view representation of LIDAR data according to example embodiments of the present disclosure. For example, FIG. 9 provides a top-view representation 650 of LIDAR data, including cell classifications determined from a range-view representation. Top-view representation 650 provides classifications for cells of LIDAR data obtained relative to an autonomous vehicle 652. Cells within top-view representation graph 650 include different visual representations corresponding to different classifications. For instance, cells 654/656/658 for which a first type of classification are determined (e.g., vehicles) are depicted using a first color, shading or other visual representation, while cells 660 for which a second type of classification are determined (e.g., pedestrians) are depicted using a second color, shading or other visual representation. Additional types of classifications and corresponding visual representations, including a classification for cells 662 corresponding to "no detected object of interest" can be utilized.

Similar to FIG. 8, FIG. 9 also depicts how bounding shapes can be generated within top-view representation 650 in light of the different cell classifications and detected objects. More particularly, bounding shape 664 can be generated for the classified cells 654 corresponding to a first detected vehicle. Bounding shape 666 can be generated for the classified cells 656 corresponding to a second detected vehicle, while bounding shape 668 can be generated for the classified cells 658 corresponding to third detected vehicle. Bounding shape 670 can be generated for the classified cells 660 corresponding to a detected pedestrian.

Figure 10:
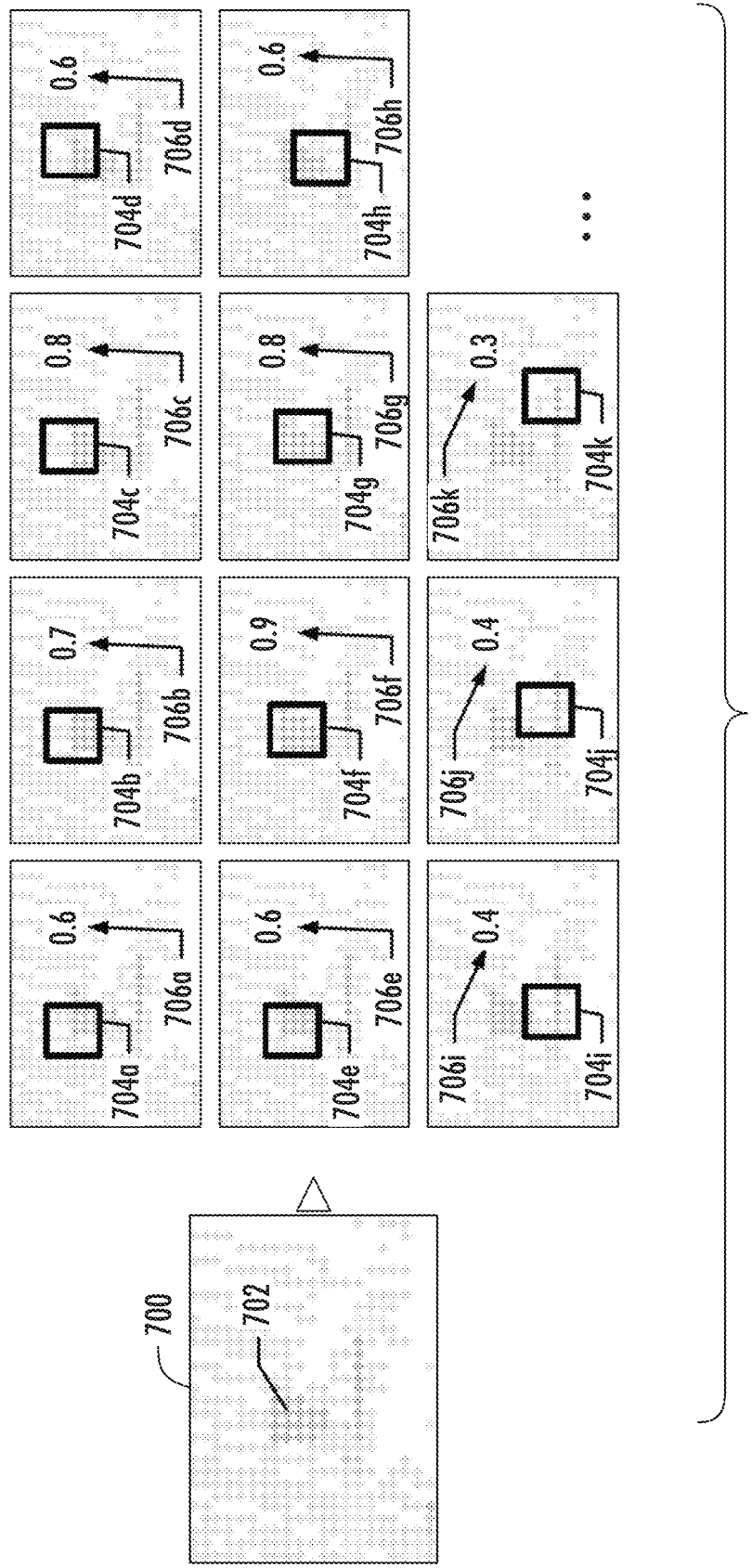
FIG. 10 depicts example aspects associated with generating a bounding shape according to example aspects of the present disclosure.

FIG. 10 depicts example aspects associated with bounding shape generation according to example aspects of the present disclosure. More particularly, FIG. 10 includes example features associated with a bounding shape generator 18 of FIG. 1. FIG. 10 depicts a LIDAR data representation 700 including a cluster of cells 702 corresponding to an object instance. For example, cluster of cells 702 can correspond to cells 660 of FIG. 9 determined as corresponding to a pedestrian classification. Ultimately, a bounding shape can be determined for cluster of cells 702. In FIG. 10, a plurality of proposed bounding shapes 704a, 704b, 704c, 704d, . . . 704k or beyond can be generated for cluster of cells 702. Each of the proposed bounding shapes 704a, 704b, 704c, 704d, . . . 704k, etc. is positioned in a different location relative to cluster of cells 702. A score 706a, 706b, 706c, 706d, . . . , 706k, etc. can be determined for each proposed bounding shape 704a, 704b, 704c, 704d, . . . , 704k, etc. In some examples, each score 706a, 706b, 706c, 706d, . . . , 706k, etc. can be based at least in part on a number of cells having one or more predetermined classifications (e.g., the number of cells within cluster of cells 702) that are located within each proposed bounding shape 704a, 704b, 704c, 704d, . . . 704k, etc. The bounding shape ultimately determined for each corresponding cluster of cells (e.g., object instance) can be determined at least in part on the scores for each proposed bounding shape. In the example of FIG. 10, for instance, proposed bounding shape 704f can be selected as the bounding shape since it has a highest score 706f among scores 706a, 706b, 706c, 706d, . . . , 706k, etc. for all proposed bounding shapes 704a, 704b, 704c, 704d, . . . 704k, etc. In some examples, the ultimate bounding shape determination from the plurality of proposed bounding shapes 704a, 704b, 704c, 704d, . . . , 704k, etc. can be additionally or alternatively based on a non-maximum suppression (NMS) analysis of the proposed bounding shapes 704a, 704b, 704c, 704d, . . . , 704k, etc. to remove and/or reduce any overlapping bounding boxes. NMS analysis or other filtering technique applied to the proposed bounding shapes 704a, 704b, 704c, 704d, . . . 704k, etc. can be implemented, for example, by filter system 20 of FIG. 1.

Figure 11:
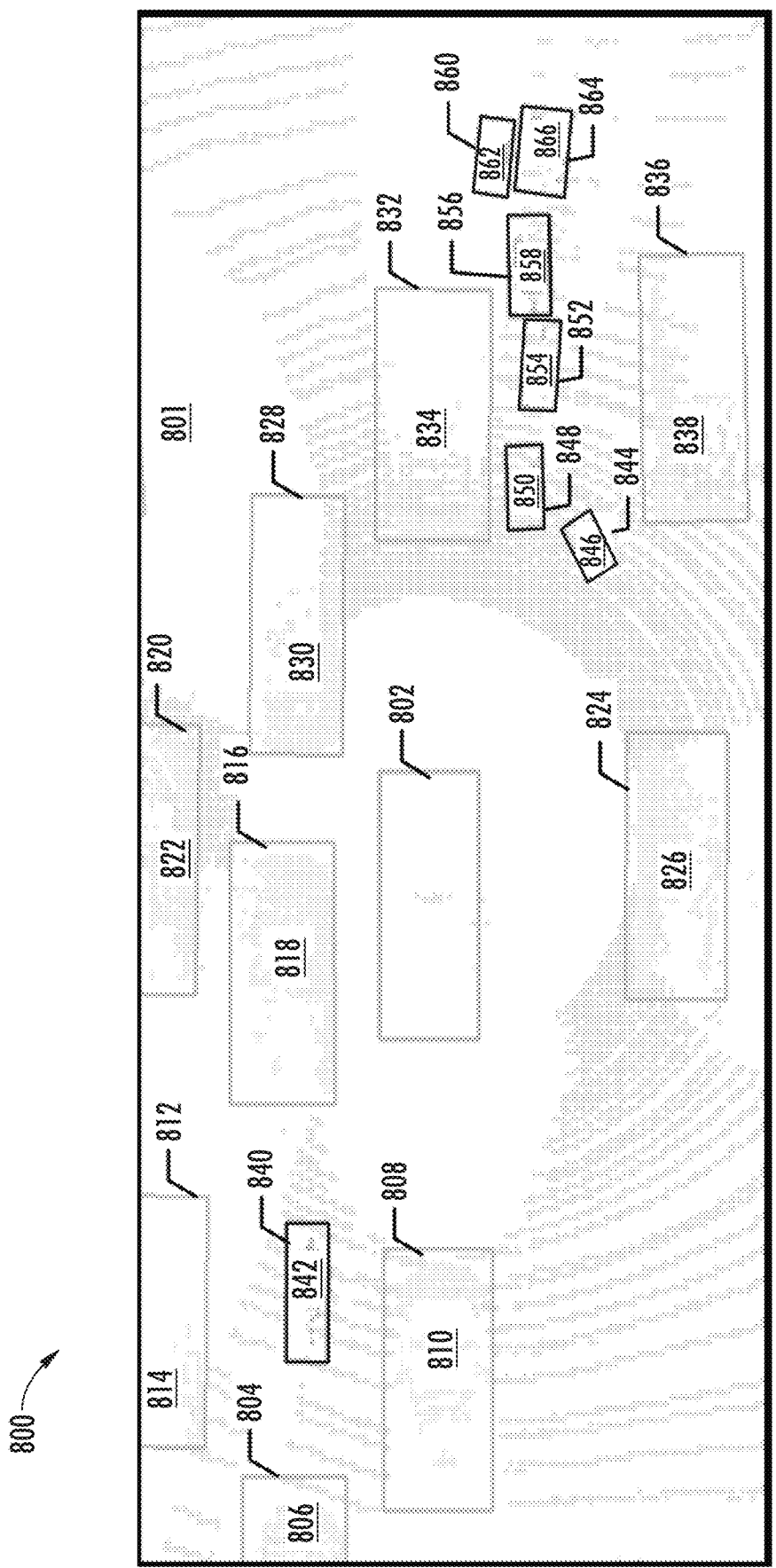
FIG. 11 provides a graphical depiction of example classification determinations and object segments according to example aspects of the present disclosure.

FIG. 11 provides a graphical depiction of example classification determinations and object segments according to example aspects of the present disclosure. More particularly, FIG. 11 provides a cell classification and segmentation graph 800 such as could be generated by hybrid-view LIDAR-based object detection system 10 of FIG. 1. The cell classification and segmentation graph 800 of FIG. 11 depicts an environment 801 surrounding an autonomous vehicle 802 with cells of LIDAR data that are classified in accordance with the disclosed technology. Nine object instances are depicted in FIG. 11 as corresponding to detected vehicles in the environment 801. These nine object instances (e.g., vehicles) are depicted by bounding box 804 associated with cluster of cells 806, bounding box 808 associated with cluster of cells 810, bounding box 812 associated with cluster of cells 814, bounding box 816 associated with cluster of cells 818, bounding box 820 associated with cluster of cells 822, bounding box 824 associated with cluster of cells 826, bounding box 828 associated with cluster of cells 830, bounding box 832 associated with cluster of cells 834, and bounding box 836 associated with cluster of cells 838. In addition, seven object instances are depicted in FIG. 11 as corresponding to detected bicycles in the environment 801. These seven object instances (e.g., bicycles) are depicted by bounding box 840 associated with cluster of cells 842, bounding box 844 associated with cluster of cells 846, bounding box 848 associated with cluster of cells 850, bounding box 852 associated with cluster of cells 854, bounding box 856 associated with cluster of cells 858, bounding box 864 associated with cluster of cells 862, and bounding box 864 associated with cluster of cells 858. It should be appreciated that cell classification and segmentation graphs such as depicted in FIG. 11 can include different detected classes of vehicles, such as including pedestrians and other objects of interest. FIG. 11 is provided as merely an example of how object instances can be determined from clusters of classified cells for which corresponding bounding shapes are determined.

Figure 13:
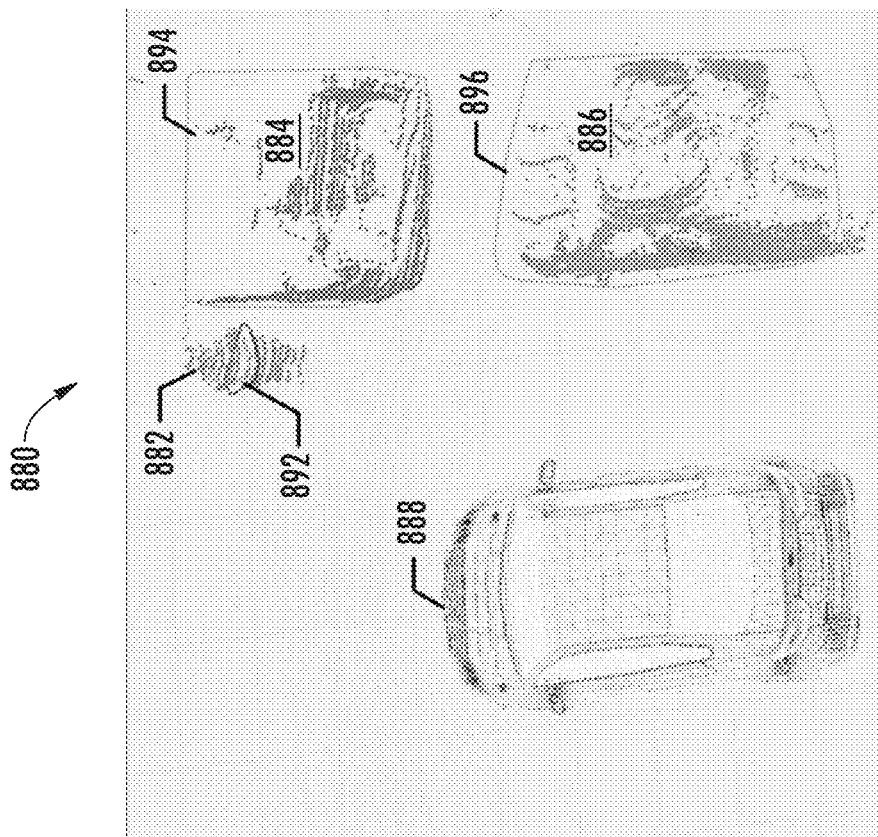
FIG. 13 provides a graphical depiction of object segmentation with utilizing a top-view representation of LIDAR data.
Figure 12:
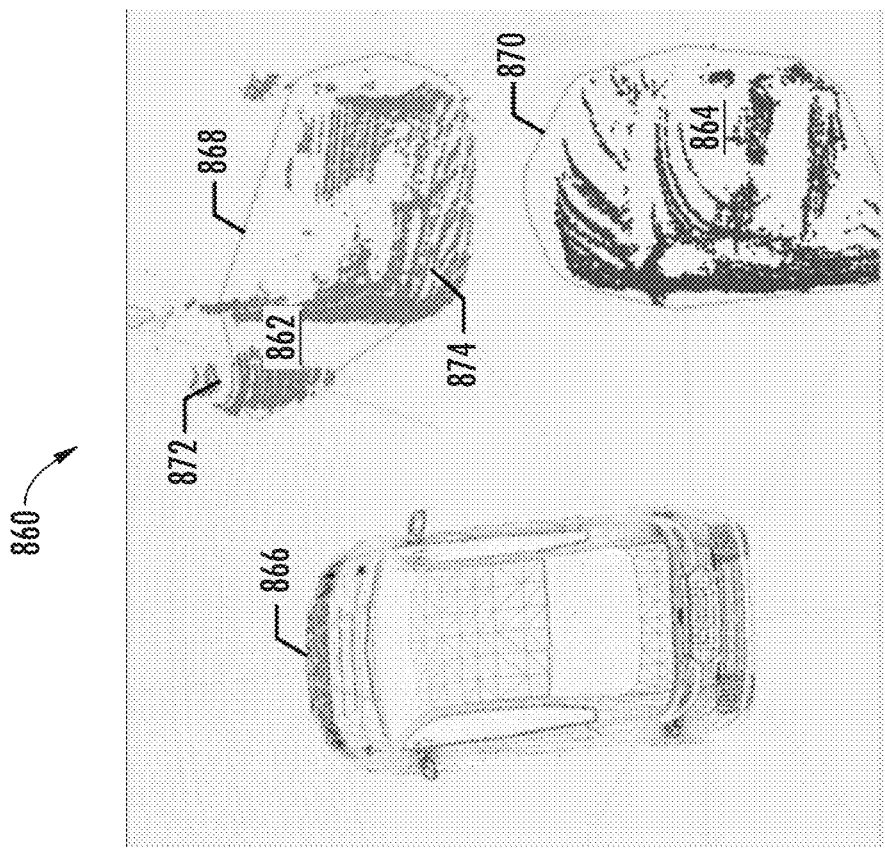
FIG. 12 provides a graphical depiction of object segmentation without utilizing a top-view representation of LIDAR data.

Referring now to FIGS. 12-13, respective illustrations depict actual results of detected object instances without utilizing hybrid-view LIDAR-based object detection (e.g., as depicted in FIG. 12) and with utilizing hybrid-view LIDAR-based object detection according to example aspects of the present disclosure (e.g., as depicted in FIG. 13).

In FIG. 12, cell classification and segmentation graph 860 depicts a first group of cells 862 of LIDAR data and a second group of cells 858 of LIDAR data determined in an environment surrounding autonomous vehicle 866. The first group of cells 862 is determined as corresponding to an object instance, namely a vehicle, represented by bounding shape 868, while the second group of cells 864 is determined as corresponding to another object instance, namely a vehicle, represented by bounding shape 870. In the cell classification and segmentation graph 860 of FIG. 12, object detection technology that does not utilize the disclosed hybrid-view LIDAR-based object detection features fails to distinguish between a first portion of cells 872 and a second portion of cells 874 within first group of cells 862. This may be due in part to limitations of such technology whereby it is difficult to distinguish smaller instances from larger instances when the instances are close to each other. In the particular example of FIG. 12, a segmentation error may result in merging the first portion of cells 872 associated with a pedestrian with the second portion of cells 874 associated with a vehicle into a single object instance represented by bounding shape 868.

In FIG. 13, cell classification and segmentation graph 880 depicts a first group of cells 882 of LIDAR data, a second group of cells 884 of LIDAR data, and a third group of cells 886 of LIDAR data determined in an environment surrounding autonomous vehicle 888. The first group of cells 882 is determined as corresponding to an object instance, namely a pedestrian, represented by bounding shape 892. The second group of cells 884 is determined as corresponding to another object instance, namely a vehicle, represented by bounding shape 894. The third group of cells 886 is determined as corresponding to another object instance, namely a vehicle, represented by bounding shape 896. In the cell classification and segmentation graph 880 of FIG. 13, object detection technology utilizes the disclosed hybrid-view LIDAR-based object detection features and is advantageously able to distinguish between the pedestrian instance represented by bounding shape 892 and the vehicle instance represented by bounding shape 894 even though these object instances are in close proximity to one another. This more accurate classification depicted in FIG. 13 can result in improved object segmentation as well as vehicle motion planning that effectively takes into account the presence of a pedestrian.

Figure 14:
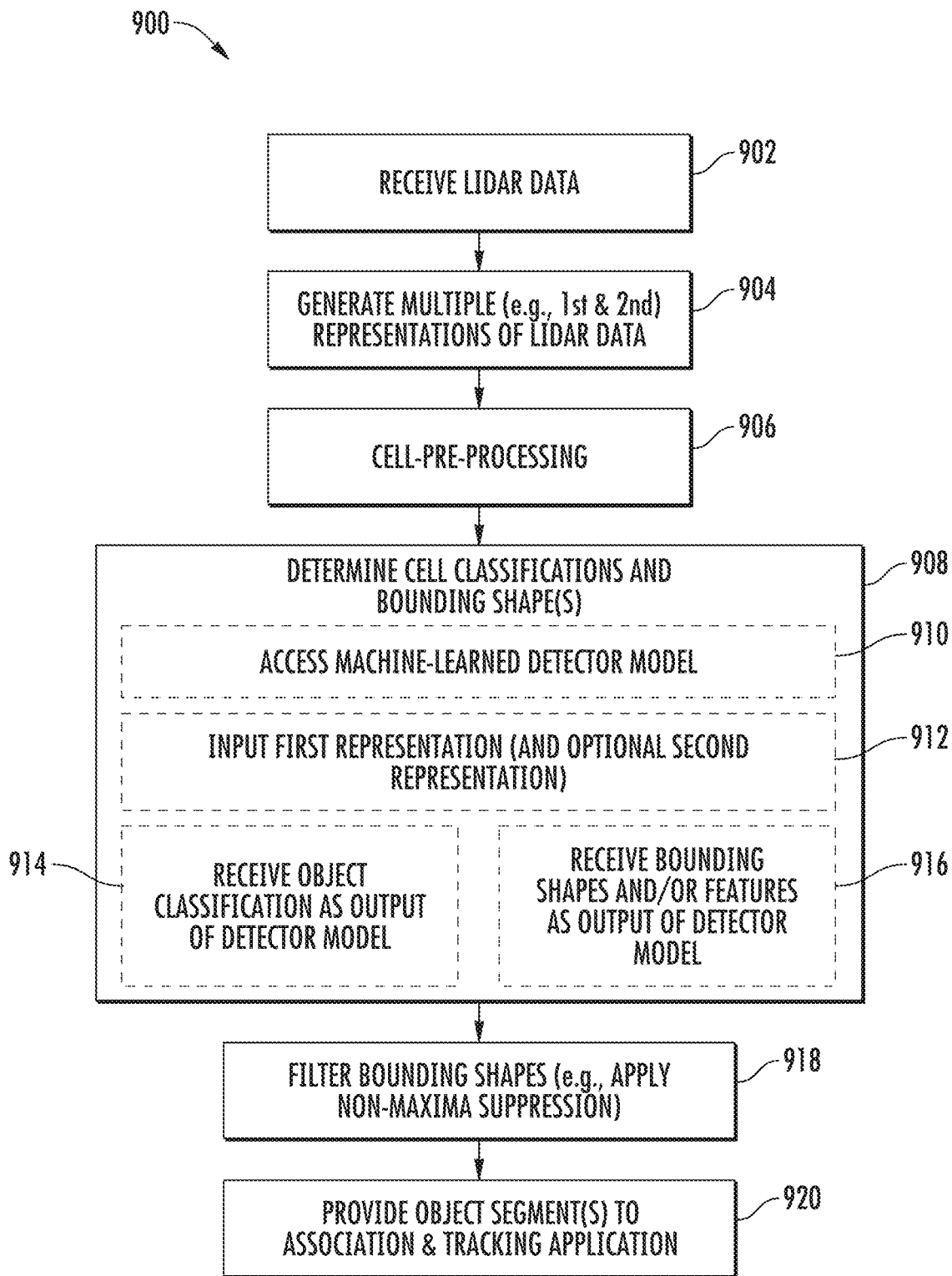
FIG. 14 provides a flowchart diagram of an example method of detecting objects according to example embodiments of the present disclosure.

FIG. 14 depicts a flowchart diagram of a first example method 900 of hybrid-view LIDAR-based object detection according to example embodiments of the present disclosure. One or more portion(s) of the method 900 can be implemented by one or more computing devices such as, for example, the computing device(s) 129 within vehicle computing system 106 of FIG. 2A, or computing system 952 or machine learning computing system 980 of FIG. 17. Moreover, one or more portion(s) of the method 900 can be implemented as an algorithm on the hardware components of the device(s) described herein (e.g., as in FIGS. 1, 2A, 2B, 7, and 17) to, for example, detect objects within sensor data.

At 902, one or more computing devices within a computing system can receive LIDAR data. LIDAR data received at 902 can be received or otherwise obtained from one or more LIDAR systems configured to transmit ranging signals relative to an autonomous vehicle. LIDAR data obtained at 902 can correspond, for example, to LIDAR data 12 of FIG. 1 and/or data generated by or otherwise obtained at LIDAR system 122 of FIG. 2A.

At 904, one or more computing devices within a computing system can generate multiple representations of the LIDAR data received at 902. For example, a first representation (e.g., first representation 30 of FIG. 1) and second representation (e.g., second representation 32 of FIG. 1) can be generated. In some implementations, the first representation and second representation generated at 904 can correspond to a range-view representation and a top-view representation, respectively. In some implementations, one or more of the multiple representations generated at 904 can be discretized into a grid of multiple cells. In some implementations, multiple representations of LIDAR data generated at 904 can be generated, for example, by representation generator 14 of FIG. 1. Example depictions of range-view representations of LIDAR data generated at 904 are provided in FIG. 3, while example depictions of top-view representations of LIDAR data generated at 904 are provided in FIGS. 4 and 5.

At 906, one or more computing devices within a computing system can implement pre-processing of the various cells of LIDAR data within the multiple representations generated at 904. In some implementations, pre-processing at 906 can include determining one or more cell statistics for characterizing the LIDAR data corresponding to each cell. Cell statistics can include, for example, one or more parameters associated with a distribution, a power, or intensity of LIDAR data points projected onto each cell. In some implementations, pre-processing at 906 can additionally include determining a feature extraction vector for each cell. A feature extraction vector determined as part of pre-processing at 906 can be determined, for example, by aggregating one or more cell statistics of surrounding cells at one or more different scales.

At 908, one or more computing devices within a computing system can determine a classification for each cell to detect objects of interest and generate bounding shapes for the detected objects. More particularly, determining cell classifications and bounding shapes at 908 can include accessing a machine-learned detector model at 910. The detector model accessed at 910 can have been trained to analyze first and/or second representations of sensor data to detect objects of interest and to generate bounding shapes for each detected object of interest. For example, the detector model accessed at 910 can have been trained to classify cells of LIDAR data as corresponding to an object classification determined from a predetermined set of classifications (e.g., vehicle, pedestrian, bicycle, no object).

Determining cell classifications and bounding shapes at 908 can further include inputting at 912 at least the first representation of the sensor data generated at 904 to the machine-learned detector model accessed at 910. In some implementations, a second representation of sensor data generated at 904 can also be provided as input at 912 to the machine-learned detector model accessed at 910. In some implementations, the first (and second) representation(s) provided at 912 as input to the machine-learned detector model can correspond to the first representation 30 and second representation 32 of FIG. 1.

Figure 15:
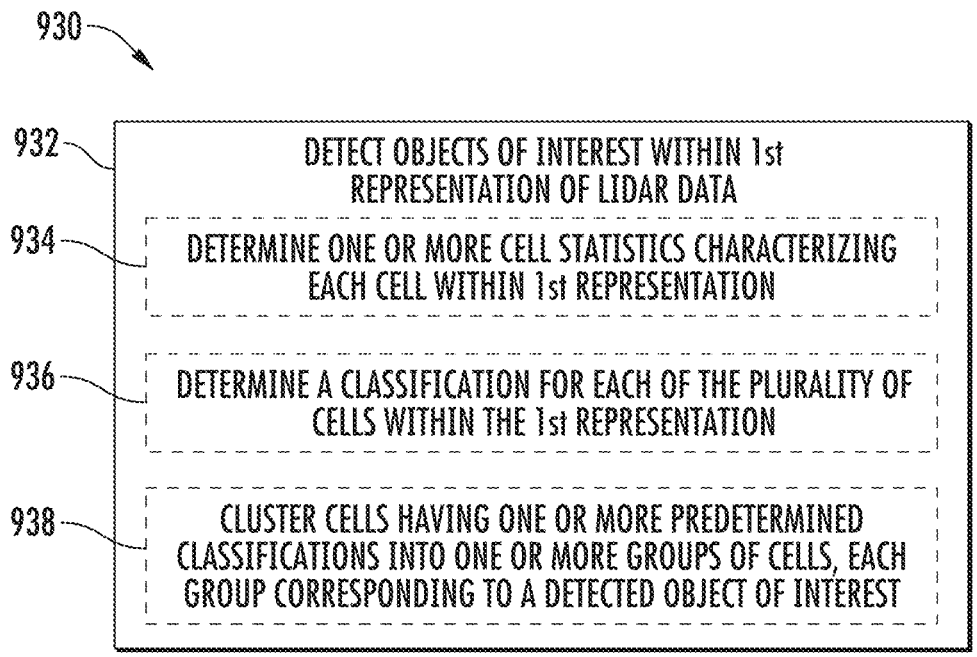
FIG. 15 depicts a flowchart diagram of example steps associated with detecting objects of interest in a first representation of sensor data according to example embodiments of the present disclosure.

Determining cell classifications and bounding shapes at 908 can further include receiving at 914, as an output of the machine-learned detector model accessed at 910 and in response to providing at least the first representation of sensor data as input at 912, an object classification. The object classification received at 914 can include, for example, an indication of a type of object classification (e.g., vehicle, pedestrian, bicycle, no object) determined for each cell within a representation of sensor data. For example, the classification for each cell can include an indication of whether that cell includes a detected object of interest from a predetermined set of objects of interest. In some implementations, the classification determined at 914 can additionally include a probability score associated with each classification. Further aspects of determining cell classifications and detecting objects of interest within a first representation of sensor data are depicted in FIG. 15.

Figure 16:
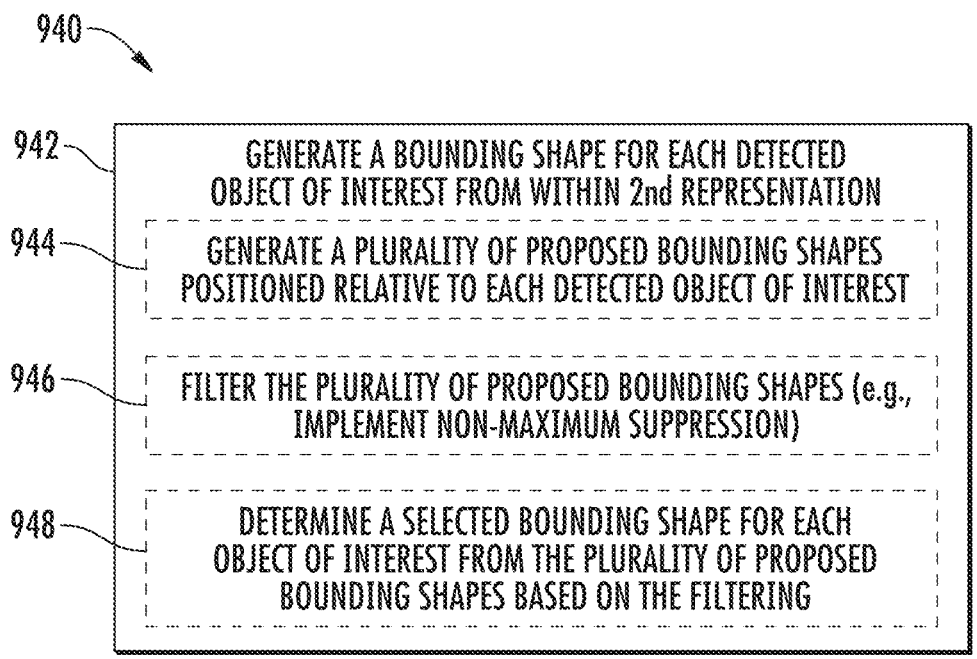
FIG. 16 depicts a flowchart diagram of example steps associated with generating a bounding shape for detected objects of interest in a second representation of sensor data according to example embodiments of the present disclosure.

Determining cell classifications and bounding shapes at 908 can further include receiving at 916, as an output of the machine-learned detector model accessed at 910 and in response to providing at least the first representation of sensor data as input at 912, at least a bounding shape corresponding to one or more detected objects of interest. Each bounding shape received at 916 can be generated relative to the second representation of the sensor data (e.g., a top-down representation of sensor data). In some implementations, a classification for each cell and a bounding shape (or features for defining a bounding shape) can be simultaneously received as an output of the detector model. The bounding shape and/or bounding shape parameters received at 916 can be received for each cell or for a subset of selected cells. Example bounding shapes received at 916 can be 2D bounding shapes (e.g., bounding boxes or other polygons) or 3D bounding shapes (e.g., prisms or other shapes). Example bounding shape parameters received at 916 can include, for example, center, orientation, width, height, other dimensions, and the like, which can be used to define a bounding shape. Further aspects of generating bounding shapes within a second representation of sensor data are depicted in FIG. 16.

Referring still to FIG. 14, at 918, one or more computing devices within a computing system can filter the bounding shapes received as output at 916. In some examples, filtering at 918 can be based at least in part on the scores determined for each proposed bounding box. In some examples, filtering at 918 can additionally or alternatively include application of a bounding box filtering technique to remove and/or reduce redundant bounding boxes corresponding to a given object instance. For example, non-maximum suppression (NMS) analysis can be implemented as part of the filtering at 918. Filtering at 918 can result in determining one of a plurality of proposed bounding shapes as a best match for each object instance. This best match can be determined as the bounding shape corresponding to an object segment.

At 920, one or more computing devices within a computing system can provide the one or more object segments determined after filtering at 918 to an object classification and tracking application. In some implementations, additional information beyond the object segments determined after filtering at 918 (e.g., the classifications determined at 914) can also be provided to an object classification and tracking application at 920. An object classification and tracking application to which object segments and/or cell classifications can be provided may correspond, for example, one or more portions of a perception system such as perception system 110 of FIGS. 1, 2A & 2B.

Although FIG. 14 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

FIG. 15 depicts a flowchart diagram of an example method 930 of detecting objects of interest in a first representation of sensor data according to example embodiments of the present disclosure. One or more portion(s) of the method 930 can be implemented by one or more computing devices such as, for example, the computing device(s) 129 within vehicle computing system 106 of FIG. 2A, or computing system 952 or machine learning computing system 980 of FIG. 17. Moreover, one or more portion(s) of the method 930 can be implemented as an algorithm on the hardware components of the device(s) described herein (e.g., as in FIGS. 1, 2A, 2B, 7, and 17) to, for example, detect objects within sensor data.

Referring more particularly to FIG. 15, detecting objects of interest in a first representation of the LIDAR data at 932 can more particularly include determining at 934 one or more cell statistics characterizing each of a plurality of cells in the first representation of the LIDAR data. Detecting objects of interest in a first representation of LIDAR data at 932 can also include determining at 936 a classification for each of the plurality of cells in the first representation of the LIDAR data based at least in part on the one or more cell statistics determined at 934. Detecting objects of interest in a first representation of LIDAR data at 932 can also include clustering at 938 cells having one or more predetermined classifications into one or more groups of cells, each group corresponding to an instance of a detected object of interest.

Although FIG. 15 depicts steps performed in a particular order for purposes of illustration and discussion, the methods of the present disclosure are not limited to the particularly illustrated order or arrangement. The various steps of the method 930 can be omitted, rearranged, combined, and/or adapted in various ways without deviating from the scope of the present disclosure.

FIG. 16 depicts a flowchart diagram of an example method 940 of generating a bounding shape for detected objects of interest in a second representation of sensor data according to example embodiments of the present disclosure. One or more portion(s) of the method 940 can be implemented by one or more computing devices such as, for example, the computing device(s) 129 within vehicle computing system 106 of FIG. 2A, or computing system 952 or machine learning computing system 980 of FIG. 17. Moreover, one or more portion(s) of the method 940 can be implemented as an algorithm on the hardware components of the device(s) described herein (e.g., as in FIGS. 1, 2A, 2B, 7, and 17) to, for example, generate bounding shapes within sensor data.

Referring more particularly to FIG. 16, generating bounding shapes within a second representation of the LIDAR data at 942 can more particularly include generating at 934 a plurality of proposed bounding shapes positioned relative to each detected object of interest in the second representation of the LIDAR data. Generating bounding shapes within a second representation of the LIDAR data at 942 can also include filtering at 936 the plurality of proposed bounding shapes positioned relative to each detected object of interest and determining at 938, at least in part as a result of the filtering at 936, a selected bounding shape for each detected object of interest.

Although FIG. 16 depicts steps performed in a particular order for purposes of illustration and discussion, the methods of the present disclosure are not limited to the particularly illustrated order or arrangement. The various steps of the method 940 can be omitted, rearranged, combined, and/or adapted in various ways without deviating from the scope of the present disclosure.

Figure 17:
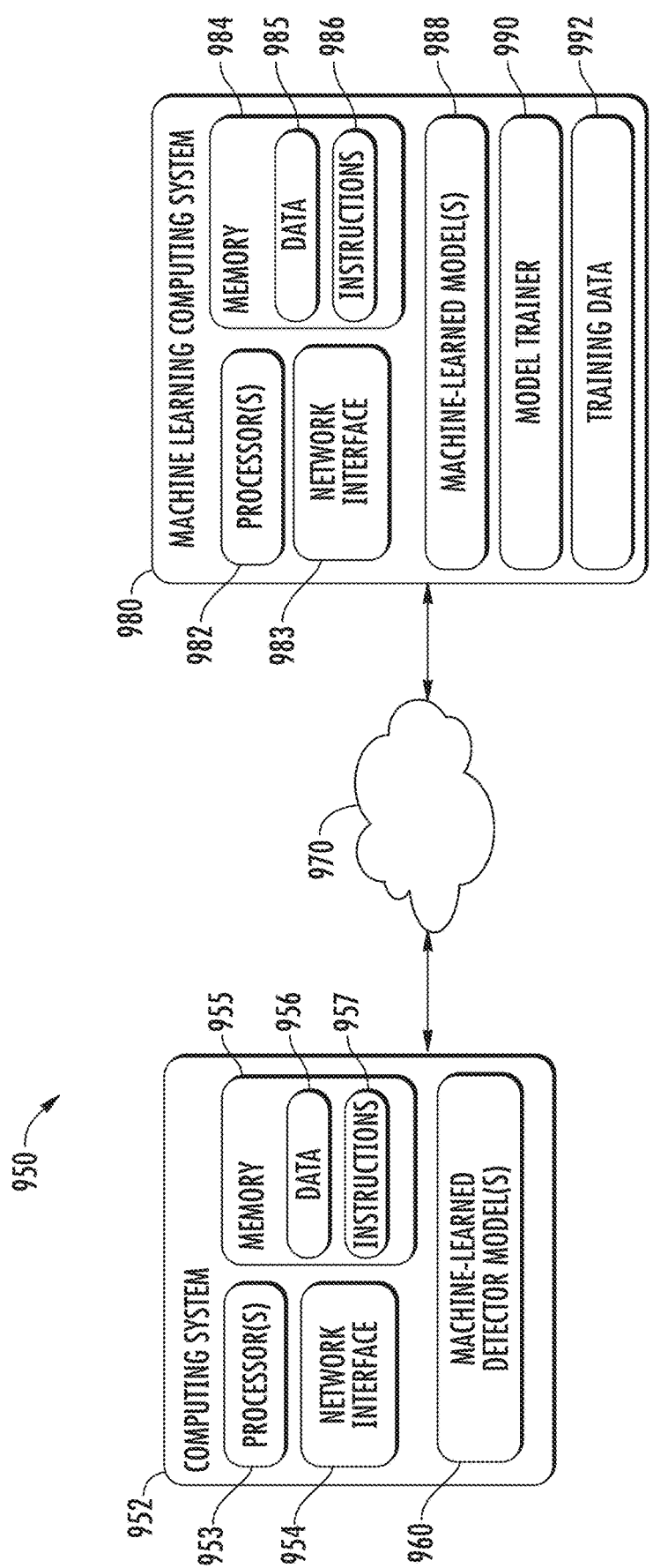
FIG. 17 depicts a block diagram of an example system according to example embodiments of the present disclosure.

FIG. 17 depicts a block diagram of an example system 950 according to example embodiments of the present disclosure. The example system 950 includes a first computing system (e.g., computing system 952) and a second computing system (e.g., machine learning computing system 980) that are communicatively coupled over a network 970. In some implementations, computing system 952 can perform autonomous vehicle motion planning including object detection, tracking, and/or classification (e.g., detecting objects and generating bounding shapes as described herein). In some implementations, computing system 952 can be included in an autonomous vehicle. For example, the computing system 952 can be on-board the autonomous vehicle. In other implementations, computing system 952 is not located on-board the autonomous vehicle. For example, computing system 952 can operate offline to perform object detection and bounding shape generation. Computing system 952 can include one or more distinct physical computing devices.

Computing system 952 includes one or more processors 953 and a memory 955. The one or more processors 953 can be any suitable processing device (e.g., a processor core, a microprocessor, an ASIC, a FPGA, a controller, a microcontroller, etc.) and can be one processor or a plurality of processors that are operatively connected. The memory 955 can include one or more non-transitory computer-readable storage media, such as RAM, ROM, EEPROM, EPROM, one or more memory devices, flash memory devices, etc., and combinations thereof.

The memory 955 can store information that can be accessed by the one or more processors 953. For instance, the memory 955 (e.g., one or more non-transitory computer-readable storage mediums, memory devices) can store data 956 that can be obtained, received, accessed, written, manipulated, created, and/or stored. The data 956 can include, for instance, LIDAR data obtained by LIDAR system 122, RADAR data obtained by RADAR system 124, image data obtained by camera(s) 126, data identifying detected and/or classified objects including current object states and predicted object locations and/or trajectories, generated bounding shapes, motion plans, machine-learned models, rules, etc. as described herein. In some implementations, computing system 952 can obtain data from one or more memory device(s) that are remote from the computing system 952.

The memory 955 can also store computer-readable instructions 957 that can be executed by the one or more processors 953. The instructions 957 can be software written in any suitable programming language or can be implemented in hardware. Additionally, or alternatively, the instructions 957 can be executed in logically and/or virtually separate threads on processor(s) 953. For example, the memory 955 can store instructions 957 that when executed by the one or more processors 953 cause the one or more processors 953 to perform any of the operations and/or functions described herein, including, for example, operations associated with any of the methods 900, 930, and/or 940 of FIGS. 14-16.

According to an aspect of the present disclosure, computing system 952 can store or include one or more machine-learned detector models 960. As examples, the detector model(s) 960 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

In some implementations, computing system 952 can receive the one or more detector models 960 from the machine learning computing system 980 over network 970 and can store the one or more detector models 960 in the memory 955. Computing system 952 can then use or otherwise implement the one or more detector models 960 (e.g., by processor(s) 953). In particular, computing system 952 can implement the detector model(s) 960 to perform object detection including determining cell classifications and corresponding optional probability scores as well as generating bounding shapes for detected objects. For example, in some implementations, computing system 952 can employ the detector model(s) 960 by inputting one or more representations of sensor data (e.g., LIDAR data) into the detector model(s) 960 and receiving detected objects and/or bounding shapes as an output of the detector model(s) 960.

The machine learning computing system 980 includes one or more processors 982 and a memory 984. The one or more processors 982 can be any suitable processing device (e.g., a processor core, a microprocessor, an ASIC, a FPGA, a controller, a microcontroller, etc.) and can be one processor or a plurality of processors that are operatively connected. The memory 984 can include one or more non-transitory computer-readable storage media, such as RAM, ROM, EEPROM, EPROM, one or more memory devices, flash memory devices, etc., and combinations thereof.

The memory 984 can store information that can be accessed by the one or more processors 982. For instance, the memory 984 (e.g., one or more non-transitory computer-readable storage mediums, memory devices) can store data 985 that can be obtained, received, accessed, written, manipulated, created, and/or stored. The data 985 can include, for instance, ranging data, image data, data identifying detected and/or classified objects including current object states and predicted object locations and/or trajectories, motion plans, machine-learned models, rules, etc. as described herein. In some implementations, the machine learning computing system 980 can obtain data from one or more memory device(s) that are remote from the machine learning computing system 980.

The memory 984 can also store computer-readable instructions 986 that can be executed by the one or more processors 982. The instructions 986 can be software written in any suitable programming language or can be implemented in hardware. Additionally, or alternatively, the instructions 986 can be executed in logically and/or virtually separate threads on processor(s) 982. For example, the memory 984 can store instructions 986 that when executed by the one or more processors 982 cause the one or more processors 982 to perform any of the operations and/or functions described herein, including, for example, operations associated with any of the methods 900, 930, and/or 940 of FIGS. 14-16.

In some implementations, the machine learning computing system 980 includes one or more server computing devices. If the machine learning computing system 980 includes multiple server computing devices, such server computing devices can operate according to various computing architectures, including, for example, sequential computing architectures, parallel computing architectures, or some combination thereof.

In addition or alternatively to the detector model(s) 960 at computing system 952, the machine learning computing system 980 can include one or more machine-learned detector models 988. As examples, the detector model(s) 988 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

As an example, machine learning computing system 980 can communicate with computing system 952 according to a client-server relationship. For example, the machine learning computing system 952 can implement the detector model(s) 988 to provide a web service to computing system 952. For example, the web service can provide an autonomous vehicle object detection and/or motion planning service.

Thus, detector model(s) 960 can be located and used at computing system 952 and/or detector model(s) 988 can be located and used at the machine learning computing system 980.

In some implementations, the machine learning computing system 980 and/or computing system 952 can train the detector model(s) 960 and/or 988 through use of a model trainer 990. The model trainer 990 can train the detector model(s) 960 and/or 988 using one or more training or learning algorithms. In some implementations, the model trainer 990 can perform supervised training techniques using a set of labeled training data. In other implementations, the model trainer 990 can perform unsupervised training techniques using a set of unlabeled training data. The model trainer 990 can perform a number of generalization techniques to improve the generalization capability of the models being trained. Generalization techniques can include weight decays, dropouts, or other techniques.

In particular, the model trainer 990 can train a machine-learned model 960 and/or 988 based on a set of training data 992. The training data 992 can include, for example, a large number of previously obtained representations of sensor data and corresponding labels that describe corresponding objects detected within such sensor data representations including bounding shapes for such detected objects. In one implementation, the detector training dataset 992 can include a first portion of data corresponding to one or more representations of sensor data (e.g., LIDAR data) originating from a LIDAR system associated with an autonomous vehicle. The sensor data (e.g., LIDAR data) can, for example, be recorded while an autonomous vehicle is in navigational operation. The detector training dataset 992 can further include a second portion of data corresponding to labels identifying corresponding objects detected within each portion of input sensor data. In some implementations, the labels can include at least a bounding shape corresponding to each detected object of interest. In some implementations, the labels can additionally include a classification for each object of interest from a predetermined set of objects including one or more of a pedestrian, a vehicle, or a bicycle. The labels included within the second portion of data within the detector training dataset can be manually annotated, automatically annotated, or annotated using a combination of automatic labeling and manual labeling.

In some implementations, to train the detector model(s) 960 and/or 988, the model trainer 990 can input a first portion of a set of ground-truth data (e.g., the first portion of the detector training dataset 992 corresponding to the one or more representations of sensor data) into the detector model(s) to be trained. In response to receipt of such first portion, the detector model outputs bounding shapes and/or classifications for objects of interest detected within the sensor data representations. This output of the detector model predicts the remainder of the set of ground-truth data (e.g., the second portion of the detector training dataset 992). After such prediction, the model trainer 990 can apply or otherwise determine a loss function that compares the bounding shapes and/or object classifications output by the detector model to the remainder of the ground-truth data which the detector model attempted to predict. The model trainer 990 then can backpropagate the loss function through the detector model to train the detector model (e.g., by modifying one or more weights associated with the detector model). This process of inputting ground-truth data, determining a loss function, and backpropagating the loss function through the detector model can be repeated numerous times as part of training the detector model. For example, the process can be repeated for each of numerous sets of ground-truth data provided within the detector training dataset. The model trainer 990 can be implemented in hardware, firmware, and/or software controlling one or more processors.

Computing system 952 can also include a network interface 954 used to communicate with one or more systems or devices, including systems or devices that are remotely located from computing system 952. The network interface 954 can include any circuits, components, software, etc. for communicating with one or more networks (e.g., network 970). In some implementations, the network interface 954 can include, for example, one or more of a communications controller, receiver, transceiver, transmitter, port, conductors, software, and/or hardware for communicating data. Similarly, the machine learning computing system 980 can include a network interface 983.

The network(s) 970 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 970 can be accomplished, for instance, via a network interface using any type of protocol, protection scheme, encoding, format, packaging, etc.

FIG. 17 illustrates one example system 950 that can be used to implement the present disclosure. Other computing systems can be used as well. For example, in some implementations, computing system 952 can include the model trainer 990 and the training dataset 992. In such implementations, the detector models 960 can be both trained and used locally at the computing system 952. As another example, in some implementations, the computing system 952 is not connected to other computing systems.

In addition, components illustrated and/or discussed as being included in one of the computing systems 952 or 980 can instead be included in another of the computing systems 952 or 980. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices. While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for detecting objects of interest, comprising:
    accessing, by a computing system that comprises one or more computing devices, a predetermined set of objects of interest;
    receiving, by the computer system, LIDAR data from one or more LIDAR systems configured to transmit ranging signals relative to an autonomous vehicle, wherein the LIDAR data includes a plurality of LIDAR points detected by the one or more LIDAR systems;
    generating, by the computing system, a top-view representation of the LIDAR data that is discretized into a grid of multiple cells;
    determining, by the computing system, one or more cell statistics characterizing the LIDAR data corresponding to the cells, the one or more cell statistics characterizing respective LIDAR data corresponding to a respective cell and comprising one or more parameters associated with a distribution of a plurality of detected LIDAR data points within the respective cell, a power of the plurality of detected LIDAR data points, or an intensity of the plurality of detected LIDAR data points projected onto the respective cell;
    determining, by the computing system, based at least in part on the one or more cell statistics, whether the cell includes at least one object included in the predetermined set of objects of interest; and
    controlling, by the computing system, one or more vehicle controls of the autonomous vehicle based, at least in part, on a determination whether the cell includes at least one object included in the predetermined set of objects of interest.

2. The method of claim 1, wherein each cell in the grid of multiple cells represents a column in three-dimensional space.

3. The method of claim 1, further comprising:
    determining, by the computing system, a classification for each cell based on whether the cell includes at least one object included in the predetermined set of objects;
    generating, by the computing system, one or more object segments based at least in part on the classification for each cell; and
    providing, by the computing system, the one or more object segments to an object classification and tracking application.

4. The method of claim 3, wherein generating, by the computing system, one or more object segments based at least in part on the classification for each cell comprises:
    clustering, by the computing system, cells having one or more predetermined classifications into one or more groups of cells, each group corresponding to an instance of a detected object of interest; and
    generating, by the computing system, a bounding shape for each instance of a detected object of interest, each bounding shape positioned relative to a corresponding cluster of cells having one or more predetermined classifications, each bounding shape corresponding to one of the one or more object segments.

5. The method of claim 4, wherein generating, by the computing system, a bounding shape positioned relative to a corresponding cluster of cells comprises:
    generating, by the computing system, a plurality of proposed bounding shapes positioned relative to each corresponding cluster of cells;
    determining, by the computing system, a score for each proposed bounding shape based at least in part on a number of cells having one or more predetermined classifications within each proposed bounding shape; and
    determining, by the computing system, the bounding shape for each corresponding cluster of cells based at least in part on the scores for each proposed bounding shape and a non-maximum suppression analysis of the proposed bounding shapes.

6. The method of claim 3, further comprising:
    determining, by the computing system, a feature extraction vector for each cell by aggregating one or more cell statistics of surrounding cells at one or more different scales; and
    wherein the classification for each cell is further based at least in part on the feature extraction vector for each cell.

7. The method of claim 3, wherein determining, by the computing system, a classification for each cell based at least in part on the one or more cell statistics comprises:
    accessing, by the computing system, a classification model that classifies cells of LIDAR data according to a predetermined set of objects of interest;

providing, by the computing system, the one or more cell statistics as input to the classification model; and receiving, by the computing system, as an output of the classification model, an indication of whether that cell includes a detected object of interest.

8. The method of claim 7, wherein the classification model includes a decision tree classifier and wherein the output of the classification model provides a classification of each detected object of interest as a pedestrian, a vehicle, or a bicycle and a probability score associated with each classification.

9. An autonomous vehicle computing system, comprising:
a LIDAR system configured to transmit ranging signals relative to an autonomous vehicle and to generate LIDAR data, wherein the LIDAR data includes a plurality of LIDAR points detected by the LIDAR system;
one or more processors;
a classification model, wherein the classification model has been trained to classify cells of LIDAR data; and
at least one tangible, non-transitory computer readable medium that stores instructions that, when executed by the one or more processors, cause the one or more processors to perform operations, the operations comprising:
accessing a predetermined set of objects of interest;
determining one or more cell statistics characterizing the LIDAR data corresponding to the cells, the one or more cell statistics characterizing respective LIDAR data corresponding to a respective cell and comprising one or more parameters associated with a distribution of a plurality of detected LIDAR data points within the respective cell, a power of the plurality of detected LIDAR data points, or an intensity of the plurality of detected LIDAR data points projected onto the respective cell;
providing the one or more cell statistics as input to the classification model;
receiving, as output of the classification model, a classification indicating whether for each cell includes a detected object from the predetermined set of objects of interest; and
controlling one or more vehicle controls of the autonomous vehicle based, at least in part, on a determination whether the cell includes at least one object included in the predetermined set of objects of interest.

10. The autonomous vehicle computing system of claim 9, wherein the classification model includes a decision tree classifier and wherein the operations further comprise receiving, as output of the classification model, a classification of each detected object of interest as a pedestrian, a vehicle, or a bicycle and a probability score associated with each classification.

11. The autonomous vehicle computing system of claim 9, wherein the operations further comprise determining a feature extraction vector for each cell by aggregating one or more cell statistics of surrounding cells at one or more different scales; and wherein the feature extraction vector is provided as input to the classification model.

12. The autonomous vehicle computing system of claim 9, wherein the operations further comprise:
generating one or more proposed bounding shapes based at least in part on the indication of whether each cell includes a detected object of interest;
filtering the one or more proposed bounding shapes to determine a bounding shape corresponding to each instance of a detected object of interest; and
providing the one or more bounding shapes to an object classification and tracking application.

13. The autonomous vehicle computing system of claim 12, wherein the classification model has been further trained to generate proposed bounding shapes for selected cells, and wherein generating one or more proposed bounding shapes comprises receiving, as output of the classification model, the one or more proposed bounding shapes.

14. The autonomous vehicle computing system of claim 12, wherein generating one or more proposed bounding shapes comprises:
clustering cells having one or more predetermined classifications into one or more groups of cells, each group corresponding to an instance of a detected object of interest; and
generating a plurality of proposed bounding shapes positioned relative to each corresponding cluster of cells.

15. An autonomous vehicle, comprising:
a sensor system comprising at least one LIDAR system configured to transmit ranging signals relative to the autonomous vehicle and to generate LIDAR data; and
a vehicle computing system comprising:
one or more processors; and
at least one tangible, non-transitory computer readable medium that stores instructions that, when executed by the one or more processors, cause the one or more processors to perform operations, the operations comprising:
receiving LIDAR data from the sensor system, wherein the LIDAR data includes a plurality of LIDAR points detected by the sensor system;
generating a top-view representation of the LIDAR data that is discretized into a grid of multiple cells, each cell representing a column in three-dimensional space;
determining one or more cell statistics characterizing the LIDAR data corresponding to the cells, the one or more cell statistics characterizing respective LIDAR data corresponding to a respective cell and comprising one or more parameters associated with a distribution of a plurality of detected LIDAR data points within the respective cell, a power of the plurality of detected LIDAR data points, or an intensity of the plurality of detected LIDAR data points projected onto the respective cell;
determining a feature extraction vector for each cell by aggregating one or more cell statistics of surrounding cells at one or more different scales;
determining a classification for each cell based at least in part on the feature extraction vector for each cell; and
controlling, by the vehicle computing system, one or more vehicle controls of the autonomous vehicle based, at least in part, on the classification for each cell.

16. The autonomous vehicle of claim 15, wherein the operations further comprise:
clustering cells having one or more predetermined classifications into one or more groups of cells, each group corresponding to an instance of a detected object of interest;
generating a bounding shape for each instance of a detected object of interest, each bounding shape positioned relative to a corresponding cluster of cells having one or more predetermined classifications; and providing the bounding shape for each instance of a detected object of interest to an object classification and tracking application.

17. The autonomous vehicle of claim 16, wherein the operations further comprise controlling motion of the autonomous vehicle based at least in part on the bounding shapes for each instance of a detected object of interest provided to the object classification and tracking application.

18. The computer-implemented method of claim 1, wherein the autonomous vehicle is a truck.

19. The computer-implemented method of claim 7, wherein the classification model is machine-learned.

20. The computer-implemented method of claim 19, wherein the classification model is a neural network.

\* \* \* \* \*